United States Patent
Wood et al.

(10) Patent No.: US 12,482,467 B2
(45) Date of Patent: *Nov. 25, 2025

(54) MEDIA SYSTEM WITH MULTIPLE DIGITAL ASSISTANTS

(71) Applicant: Roku, Inc., San Jose, CA (US)

(72) Inventors: Anthony John Wood, San Jose, CA (US); David Stern, Los Gatos, CA (US); Gregory Mack Garner, Springdale, AZ (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,339

(22) Filed: Mar. 7, 2024

(65) Prior Publication Data

US 2024/0212683 A1 Jun. 27, 2024

Related U.S. Application Data

(63) Continuation of application No. 18/188,648, filed on Mar. 23, 2023, now Pat. No. 11,961,521, which is a
(Continued)

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *H04L 67/1014* (2013.01); *G10L 2015/088* (2013.01); *G10L 2015/223* (2013.01)

(58) Field of Classification Search
CPC ....... G06F 3/167; G06F 3/16; H04L 67/1014; G10L 2015/088; G10L 15/08; G10L 2015/223; G10L 15/22
See application file for complete search history.

(56) References Cited

U.S. PATENT DOCUMENTS

| | | |
|---|---|---|
| 6,747,566 B2 | 6/2004 | Hou |
| 7,072,686 B1 | 7/2006 | Schrager et al. |

(Continued)

FOREIGN PATENT DOCUMENTS

| | | |
|---|---|---|
| EP | 2897126 A1 | 7/2015 |
| EP | 2899717 A2 | 7/2015 |

(Continued)

OTHER PUBLICATIONS

Chan, K.Y. et al., "Speech Recognition Enhancement Using Beamforming and a Genetic Algorithm," Third International Conference on Network and System Security pp. 510-515, IEEE, (Oct. 2009).
(Continued)

*Primary Examiner* — Huyen X Vo
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for providing voice control using multiple digital assistants. In some embodiments, a voice platform operates to receive a voice input from a user. The voice platform selects a digital assistant from a plurality of digital assistants based on a trigger word. The voice platform then generates an intent from the voice input using the selected digital assistant. The voice platform then transmits the intent to a media device for processing.

20 Claims, 18 Drawing Sheets

Related U.S. Application Data continuation of application No. 17/347,021, filed on Jun. 14, 2021, now Pat. No. 11,646,025, which is a continuation of application No. 16/032,724, filed on Jul. 11, 2018, now Pat. No. 11,062,702.

(60) Provisional application No. 62/550,940, filed on Aug. 28, 2017.

(51) Int. Cl.
*H04L 67/1014* (2022.01)
*G10L 15/08* (2006.01)

(56) References Cited

U.S. PATENT DOCUMENTS

| | | | |
|---|---|---|---|
| 7,295,882 B2 | 11/2007 | Champion et al. |
| 7,653,761 B2 | 1/2010 | Juster et al. |
| 8,094,891 B2 | 1/2012 | Andreasson |
| 8,340,975 B1 | 12/2012 | Rosenburger |
| 8,620,658 B2 | 12/2013 | Nakade et al. |
| 9,111,522 B1 | 8/2015 | Worley, III |
| 9,329,831 B1 | 5/2016 | Fullerton et al. |
| 9,443,529 B2 | 9/2016 | Eddington, Jr. |
| 9,689,960 B1 | 6/2017 | Barton et al. |
| 9,721,570 B1 | 8/2017 | Beal et al. |
| 9,729,994 B1 | 8/2017 | Eddins et al. |
| 9,779,735 B2 | 10/2017 | Civelli et al. |
| 9,830,924 B1 | 11/2017 | Degges, Jr. et al. |
| 9,898,250 B1 | 2/2018 | Williams et al. |
| 9,953,634 B1 | 4/2018 | Pearce et al. |
| 9,955,319 B2 | 4/2018 | Matus et al. |
| 10,034,135 B1 | 7/2018 | Provost et al. |
| 10,147,439 B1 | 12/2018 | Kristjansson et al. |
| 10,210,863 B2 | 2/2019 | Gamer et al. |
| 10,237,256 B1 | 3/2019 | Pena et al. |
| 10,255,917 B2 | 4/2019 | Carey et al. |
| 10,271,093 B1 | 4/2019 | Jobanputra et al. |
| 10,353,480 B2 | 7/2019 | Roman et al. |
| 10,354,658 B2 | 7/2019 | Wilberding |
| 10,366,699 B1 | 7/2019 | Dharia et al. |
| 10,425,981 B2 | 9/2019 | Asnis et al. |
| 10,452,350 B2 | 10/2019 | Asnis et al. |
| 10,455,322 B2 | 10/2019 | Gamer et al. |
| 10,489,111 B2 | 11/2019 | Jeong |
| 10,524,070 B2 | 12/2019 | Kadri |
| 10,529,332 B2 | 1/2020 | Lemay et al. |
| 10,565,998 B2 | 2/2020 | Wilberding |
| 10,565,999 B2 | 2/2020 | Wilberding |
| 10,593,328 B1 | 3/2020 | Wang et al. |
| 10,599,377 B2 | 3/2020 | Vassigh et al. |
| 10,770,067 B1 | 9/2020 | Prasad et al. |
| 10,777,197 B2 | 9/2020 | Wood et al. |
| 11,057,664 B1 | 7/2021 | Dodge et al. |
| 11,062,702 B2 | 7/2021 | Wood et al. |
| 11,062,710 B2 | 7/2021 | Wood et al. |
| 11,126,389 B2 | 9/2021 | Vassigh et al. |
| 11,145,298 B2 | 10/2021 | Maker et al. |
| 11,646,025 B2 | 5/2023 | Wood et al. |
| 11,664,026 B2 | 5/2023 | Maker et al. |
| 11,804,227 B2 | 10/2023 | Wood et al. |
| 11,924,511 B2 | 3/2024 | Wood et al. |
| 11,935,537 B2 | 3/2024 | Maker et al. |
| 11,961,521 B2 | 4/2024 | Wood et al. |
| 2002/0091511 A1 | 7/2002 | Hellwig et al. |
| 2002/0126035 A1 | 9/2002 | Hou |
| 2003/0040907 A1 | 2/2003 | Chang et al. |
| 2004/0066941 A1 | 4/2004 | Amada et al. |
| 2004/0131207 A1 | 7/2004 | Park |
| 2005/0216949 A1 | 9/2005 | Candelora et al. |
| 2005/0254640 A1 | 11/2005 | Ohki et al. |
| 2006/0020662 A1 | 1/2006 | Robinson |
| 2006/0200350 A1 | 9/2006 | Attwater et al. |
| 2006/0212478 A1 | 9/2006 | Plastina et al. |
| 2006/0235701 A1 | 10/2006 | Cane et al. |
| 2007/0113725 A1 | 5/2007 | Oliver et al. |
| 2007/0174866 A1 | 7/2007 | Brown et al. |
| 2007/0276866 A1 | 11/2007 | Bodin et al. |
| 2007/0291956 A1 | 12/2007 | Loether et al. |
| 2007/0296701 A1 | 12/2007 | Pope et al. |
| 2008/0154613 A1 | 6/2008 | Haulick et al. |
| 2008/0312935 A1 | 12/2008 | Mau, II |
| 2008/0317292 A1 | 12/2008 | Baker et al. |
| 2009/0044687 A1 | 2/2009 | Sorber |
| 2009/0055185 A1 | 2/2009 | Nakade et al. |
| 2009/0055426 A1 | 2/2009 | Kalasapur et al. |
| 2009/0063414 A1 | 3/2009 | White et al. |
| 2009/0138507 A1 | 5/2009 | Burckart et al. |
| 2009/0164516 A1 | 6/2009 | Svendsen et al. |
| 2009/0172538 A1 | 7/2009 | Bates et al. |
| 2009/0222392 A1 | 9/2009 | Martin et al. |
| 2009/0243909 A1 | 10/2009 | Reams et al. |
| 2009/0248413 A1 | 10/2009 | Liu et al. |
| 2009/0325602 A1 | 12/2009 | Higgins et al. |
| 2009/0328087 A1 | 12/2009 | Higgins et al. |
| 2010/0333163 A1 | 12/2010 | Daly |
| 2011/0077751 A1 | 3/2011 | Redi |
| 2011/0261950 A1 | 10/2011 | Yamaguchi |
| 2011/0294490 A1 | 12/2011 | Faenger |
| 2011/0295843 A1 | 12/2011 | Ingrassia et al. |
| 2012/0062729 A1 | 3/2012 | Hart et al. |
| 2012/0128176 A1 | 5/2012 | Acero et al. |
| 2012/0146788 A1 | 6/2012 | Wilson et al. |
| 2012/0185247 A1 | 7/2012 | Tzirkel-Hancock et al. |
| 2012/0215537 A1 | 8/2012 | Igarashi |
| 2012/0224714 A1 | 9/2012 | Couse et al. |
| 2013/0060571 A1 | 3/2013 | Soemo et al. |
| 2013/0147770 A1 | 6/2013 | Dahl et al. |
| 2013/0238326 A1 | 9/2013 | Kim et al. |
| 2013/0300651 A1 | 11/2013 | Lim |
| 2013/0304758 A1 | 11/2013 | Gruber et al. |
| 2014/0081630 A1 | 3/2014 | Jung |
| 2014/0163978 A1 | 6/2014 | Basye et al. |
| 2014/0168130 A1 | 6/2014 | Hirai |
| 2014/0172953 A1 | 6/2014 | Blanksteen |
| 2014/0184905 A1 | 7/2014 | Mountain |
| 2014/0222436 A1 | 8/2014 | Binder et al. |
| 2014/0254806 A1 | 9/2014 | Fonseca, Jr. et al. |
| 2014/0270695 A1 | 9/2014 | Banks |
| 2014/0278437 A1 | 9/2014 | Shen |
| 2014/0309993 A1 | 10/2014 | Goussard |
| 2014/0337016 A1 | 11/2014 | Herbig et al. |
| 2014/0363024 A1 | 12/2014 | Apodaca |
| 2014/0365226 A1 | 12/2014 | Sinha |
| 2014/0365526 A1 | 12/2014 | Sinha |
| 2014/0372109 A1 | 12/2014 | Iyer |
| 2015/0018992 A1 | 1/2015 | Griffiths et al. |
| 2015/0032456 A1 | 1/2015 | Wait |
| 2015/0036573 A1 | 2/2015 | Malik et al. |
| 2015/0046157 A1 | 2/2015 | Wolff et al. |
| 2015/0100322 A1 | 4/2015 | Lee |
| 2015/0154647 A1 | 6/2015 | Suwald et al. |
| 2015/0169284 A1 | 6/2015 | Quast et al. |
| 2015/0194152 A1 | 7/2015 | Katuri et al. |
| 2015/0206529 A1 | 7/2015 | Kwon et al. |
| 2015/0276254 A1 | 10/2015 | Nemcek et al. |
| 2015/0281878 A1 | 10/2015 | Roundtree et al. |
| 2015/0296289 A1 | 10/2015 | Lakkundi et al. |
| 2015/0331666 A1 | 11/2015 | Bucsa et al. |
| 2015/0373393 A1 | 12/2015 | Lee et al. |
| 2016/0038848 A1 | 2/2016 | Chen et al. |
| 2016/0071513 A1 | 3/2016 | Sun et al. |
| 2016/0095063 A1 | 3/2016 | Vigier et al. |
| 2016/0098992 A1 | 4/2016 | Renard et al. |
| 2016/0099007 A1 | 4/2016 | Alvarez et al. |
| 2016/0142840 A1 | 5/2016 | Das et al. |
| 2016/0142875 A1 | 5/2016 | Awoniyi-Oteri et al. |
| 2016/0148614 A1 | 5/2016 | Yoon |
| 2016/0150472 A1 | 5/2016 | Yoon et al. |
| 2016/0171971 A1 | 6/2016 | Suskind |
| 2016/0192069 A1 | 6/2016 | McIntosh et al. |
| 2016/0212488 A1 | 7/2016 | Os et al. |
| 2016/0217790 A1 | 7/2016 | Sharifi |
| 2016/0267913 A1 | 9/2016 | Kim et al. |

(56) References Cited

U.S. PATENT DOCUMENTS

| | | |
|---|---|---|
| 2016/0314546 A1 | 10/2016 | Malnati et al. |
| 2016/0322047 A1 | 11/2016 | Kawashima et al. |
| 2017/0011742 A1 | 1/2017 | Jing et al. |
| 2017/0041359 A1 | 2/2017 | Kwan |
| 2017/0048615 A1 | 2/2017 | Son et al. |
| 2017/0061248 A1 | 3/2017 | Ryan, Jr. et al. |
| 2017/0076720 A1 | 3/2017 | Gopalan et al. |
| 2017/0083285 A1 | 3/2017 | Meyers et al. |
| 2017/0084277 A1 | 3/2017 | Sharifi |
| 2017/0133011 A1 | 5/2017 | Chen et al. |
| 2017/0142533 A1 | 5/2017 | Park et al. |
| 2017/0161278 A1 | 6/2017 | Carr et al. |
| 2017/0186428 A1 | 6/2017 | Kunitake et al. |
| 2017/0195815 A1 | 7/2017 | Christoph et al. |
| 2017/0206896 A1 | 7/2017 | Ko et al. |
| 2017/0212723 A1 | 7/2017 | Atarot et al. |
| 2017/0243576 A1 | 8/2017 | Millington et al. |
| 2017/0245076 A1 | 8/2017 | Kusano et al. |
| 2017/0269975 A1 | 9/2017 | Wood et al. |
| 2017/0286049 A1 | 10/2017 | Kim et al. |
| 2017/0289678 A1 | 10/2017 | Melanson et al. |
| 2018/0014075 A1 | 1/2018 | Lewis et al. |
| 2018/0025001 A1 | 1/2018 | Patel et al. |
| 2018/0025733 A1 | 1/2018 | Qian et al. |
| 2018/0033424 A1 | 2/2018 | Pechanec et al. |
| 2018/0047394 A1 | 2/2018 | Tian et al. |
| 2018/0077233 A1 | 3/2018 | Chang et al. |
| 2018/0077538 A1 | 3/2018 | Matus et al. |
| 2018/0122373 A1 | 5/2018 | Gamer et al. |
| 2018/0210703 A1 | 7/2018 | Meyers et al. |
| 2018/0218234 A1 | 8/2018 | Engineer |
| 2018/0253209 A1 | 9/2018 | Jaygarl et al. |
| 2018/0286391 A1 | 10/2018 | Carey et al. |
| 2018/0293484 A1* | 10/2018 | Wang ................... G06F 16/632 |
| 2018/0330723 A1 | 11/2018 | Acero |
| 2018/0349093 A1 | 12/2018 | McCarty et al. |
| 2019/0013019 A1* | 1/2019 | Lawrence ........... G10L 15/1815 |
| 2019/0018635 A1 | 1/2019 | Vassigh et al. |
| 2019/0051305 A1 | 2/2019 | Liddell et al. |
| 2019/0058942 A1 | 2/2019 | Gamer et al. |
| 2019/0066672 A1 | 2/2019 | Wood et al. |
| 2019/0066673 A1 | 2/2019 | Wood et al. |
| 2019/0066687 A1 | 2/2019 | Wood et al. |
| 2019/0149584 A1 | 5/2019 | DiBello et al. |
| 2019/0251960 A1 | 8/2019 | Maker et al. |
| 2020/0086892 A1 | 3/2020 | Alequin |
| 2020/0225896 A1 | 7/2020 | Vassigh et al. |
| 2021/0304765 A1 | 9/2021 | Wood et al. |
| 2021/0327433 A1 | 10/2021 | Wood et al. |
| 2021/0383807 A1 | 12/2021 | Maker et al. |
| 2022/0004349 A1 | 1/2022 | Vassigh et al. |
| 2023/0223024 A1 | 7/2023 | Wood et al. |
| 2023/0252992 A1 | 8/2023 | Maker et al. |
| 2024/0005926 A1 | 1/2024 | Wood et al. |
| 2024/0031646 A1 | 1/2024 | Wood et al. |

FOREIGN PATENT DOCUMENTS

| | | |
|---|---|---|
| KR | 20140023169 A | 2/2014 |
| WO | WO 2015/041892 A1 | 3/2015 |
| WO | WO 2016/032021 A1 | 3/2016 |
| WO | WO 2016/057268 A1 | 4/2016 |
| WO | WO 2016/094418 A1 | 6/2016 |

OTHER PUBLICATIONS

International Search Report and Written Opinion of the International Searching Authority for International Application No. PCT/US17/50629, mailed Sep. 27, 2017 (14 pages).

International Search Report and Written Opinion of the International Searching Authority for International Application No. PCT/US2018/041402, mailed Oct. 4, 2018 (6 pages).

International Search Report and Written Opinion of the International Searching Authority for International Application No. PCT/US2018/048104, mailed Dec. 17, 2018 (10 pages).

International Search Report and Written Opinion of the International Searching Authority for International Application No. PCT/US2018/048101, mailed Dec. 18, 2018 (14 pages).

International Search Report and Written Opinion of the International Searching Authority for International Application No. PCT/US2018/048106, mailed Jan. 16, 2019 (10 pages).

International Search Report and Written Opinion of the International Searching Authority for International Application No. PCT/US2018/000260, mailed Jan. 3, 2019 (14 pages).

Notification of the Transmittal of the International Search Report and the Written Opinion of the International Searching Authority directed to application No. PCT/US2019/017429, dated May 21, 2019, 10 pages.

Extended European Search Report for EP Application No. 17867227.5, European Patent Office, Munich, Germany, mailed on Feb. 24, 2020, 8 pages.

Extended European Search Report for EP Application No. 18852011.8, mailed Mar. 15, 2021, 8 pages.

Extended European Search Report for EP Application No. 18831837.2 mailed Mar. 9, 2021, 12 pages.

Extended European Search Report for EP Application No. 18849591.5 mailed Apr. 30, 2021, 11 pages.

Extended European Search Report for EP Application No. 18851376.6 mailed Apr. 30, 2021, 9 pages.

Supplementary European Search Report and Opinion for EP Application No. 19755020.5, mailed Oct. 14, 2021, 9 pages.

T. Kawahara, Chin-Hui Lee and Biing-Hwang Juang, "Flexible speech understanding based on combined key-phrase detection and verification," in IEEE Transactions on Speech and Audio Processing, vol. 6, No. 6, pp. 558-568, Nov. 1998, doi: 10.1109/89.725322. (Year: 1998).

P.-S. Huang, K. Kumar, C. Liu, Y. Gong and L. Deng, "Predicting speech recognition confidence using deep learning with word identity and score features," 2013 IEEE International Conference on Acoustics, Speech and Signal Processing. Vancouver, BC, Canada, 2013, pp. 7413-7417, ICASSP.2013. (Year: 2013).

International Search Report and Written Opinion of the International Searching Authority directed to related International Patent Application No. PCT/US2019/053992, mailed Jan. 29, 2020; 08 pages.

Partial Supplementary European Search Report for EP Application No. 18831837.2 mailed on Mar. 9, 2021, 14 pages.

Supplementary European Search Report directed to related European Application No. 19868969.7, mailed on May 19, 2022; 8 pages.

* cited by examiner

MEDIA SYSTEM WITH MULTIPLE DIGITAL ASSISTANTS

CROSS-REFERENCE TO RELATED APPLICATIONS

This application is a continuation of U.S. patent application Ser. No. 18/188,648, filed Mar. 23, 2023, now allowed, which is a continuation of U.S. patent application Ser. No. 17/347,021, filed Jun. 14, 2021, now U.S. Pat. No. 11,646,025, which is a continuation of U.S. patent application Ser. No. 16/032,724, filed Jul. 11, 2018, now U.S. Pat. No. 11,062,702, which claims priority to U.S. Provisional Patent Application titled "Media System With Multiple Digital Assistants," Ser. No. 62/550,940, filed Aug. 28, 2017; and is related to U.S. patent application titled "Audio Responsive Device With Play/Stop And Tell Me Something Buttons," Ser. No. 16/032,730, filed Jul. 11, 2018, now U.S. Pat. No. 10,777,197; U.S. patent application titled "Local And Cloud Speech Recognition," Ser. No. 16/032,868, filed Jul. 11, 2018, now U.S. Pat. No. 11,062,710; U.S. patent application Ser. No. 15/962,478 titled "Remote Control with Presence Sensor," filed Apr. 25, 2018, now U.S. Pat. No. 10,455,322; U.S. patent application Ser. No. 15/341,552 titled "Reception Of Audio Commands," filed Nov. 2, 2016, now U.S. Pat. No. 10,210,863; and U.S. patent application Ser. No. 15/646,379 titled "Controlling Visual Indicators In An Audio Responsive Electronic Device, and Capturing and Providing Audio Using an API, By Native and Non-Native Computing Devices and Services," filed Jul. 11, 2017, now U.S. Pat. No. 10,599,377, all of which are herein incorporated by reference in their entireties.

BACKGROUND

Field

This disclosure is generally directed to distributing the performance of speech recognition among a remote control device and a voice platform in the cloud in order to improve speech recognition and reduce power usage, network usage, memory usage, and processing time. This disclosure is further directed to providing voice control in a media streaming environment using multiple digital assistants.

Background

Many remote control devices, including universal remote controls, audio responsive remote controls, cell phones, and personal digital assistants (PDAs), to name just a few examples, allow a user to remotely control various electronic devices and are typically powered by a remote power supply, such as a battery or power cell. It is desirable to maximize the time that a remote control device may operate before its power supply must be replaced or recharged. But the functionality of and demands on remote control devices have increased through the years.

For example, an audio responsive remote control device may receive voice input from a user. The audio responsive remote control device may analyze the voice input to recognize trigger words and commands. But the audio responsive remote control may process the voice commands incorrectly because of the presence of background noise that negatively impacts the ability of the audio responsive remote control to clearly receive and recognize the voice command. This may prevent the audio responsive remote control from performing the voice commands, or may cause the audio responsive remote control to perform the incorrect voice commands.

In order to improve the recognition of the voice input, an audio responsive remote control may require a faster processor and increased memory. But a faster processor and increased memory may require greater power consumption, which results in greater power supply demands and reduced convenience and reliability because of the shorter intervals required between replacing or recharging batteries.

In order to reduce power consumption, an audio responsive remote control device may send the voice input to a voice service in the cloud for remote processing (rather than processing locally). The voice service may then analyze the voice input to recognize trigger words and commands. For example, rather than processing locally, an audio responsive remote control device may send the voice input to a digital assistant at the voice service which may analyze the voice input in order to recognize commands to be performed. The digital assistant may use automated speech recognition and natural language processing techniques to determine the task the user is intending to perform. Because the digital assistant at the voice service analyzes the voice input, the audio responsive remote control device may not require a faster processor and increased memory.

But sending the voice input to a voice service in the cloud for remote processing may increase network consumption, especially where the voice input is continuously streamed to the voice service. Moreover, sending the voice input to a voice service in the cloud may increase the response time for handling the voice input. For example, a user may not be able to immediately issue a voice command to an audio responsive remote control because high latency may be associated with sending the voice command to the voice service. This lack of responsiveness may decrease user satisfaction.

Moreover, an audio responsive remote control device is typically configured to work with a single digital assistant (e.g., at a voice service). But various types of digital assistants have been developed through the years for understanding and performing different types of tasks. Each of these digital assistants is often good at performing certain types of tasks but poor at performing other types of tasks. For example, some digital assistants understand general natural language requests from a user. Some digital assistants are optimized for understanding requests from a user based on personal data collected about the user. Some digital assistants are optimized for understanding requests from a user based on location data.

A user often wants to use all of these various types of digital assistants. But because an audio responsive remote control device is often configured to work with a single digital assistant, a user may be forced to buy different audio responsive electronic devices that are configured to work with different digital assistants. This is often prohibitively expensive for a user. Moreover, even if a user buys several different audio responsive remote control device that are configured to work with different digital assistants, there is no integration across the different digital assistants. Finally, a user may often select a digital assistant that is not the best solution for a task.

SUMMARY

Provided herein are system, apparatus, article of manufacture, method and/or computer program product embodiments, and/or combinations and sub-combinations thereof, for distributing the performance of speech recognition between a remote control device and a voice platform in the cloud. Some embodiments operate to detect a trigger word in a voice input at a remote control device. The remote control device then processes the voice input and transmits the voice input to a voice platform in order to determine an intent associated with the voice input.

While embodiments are described with respect to the example of performing speech recognition between an audio responsive remote control device and a voice platform in the cloud in a media streaming environment, these embodiments are applicable to the control of any electronic devices in any environment.

Also described herein are embodiments for providing voice control in a media streaming environment using multiple digital assistants. Some embodiments operate to select a digital assistant from a plurality of digital assistants based on a trigger word. Some embodiments generate an intent from the voice input using the selected digital assistant.

While embodiments are described with respect to the example of providing voice control of a media device using multiple digital assistants, these embodiments are applicable to the control of any electronic devices in any environment.

Also described herein are embodiments for an audio responsive electronic device. The audio responsive electronic device includes a data storage having stored therein an intent queue. Intents are stored in the intent queue. The audio responsive electronic device operates by receiving an indication that a user pressed the play/stop button. The audio responsive electronic device retrieves from the intent queue an intent last stored in the queue, wherein the retrieved intent is associated with content previously paused. The audio responsive electronic device also retrieves from the intent queue state information associated with the paused content, and then causes content to be played based on at least the paused content and the state information.

In some embodiments, the audio responsive electronic device receives an indication that a user selected tell me something functionality. In response, the audio responsive electronic device determines an identity of the user, determines a location of the identified user, and accesses information relating to the identified user. Based on this information, the audio responsive electronic device retrieves a topic from a topic database, and customizes the retrieved topic for the identified user. Then, the audio responsive electronic device audibly provides the customized topic to the identified user.

This Summary is provided merely for purposes of illustrating some example embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
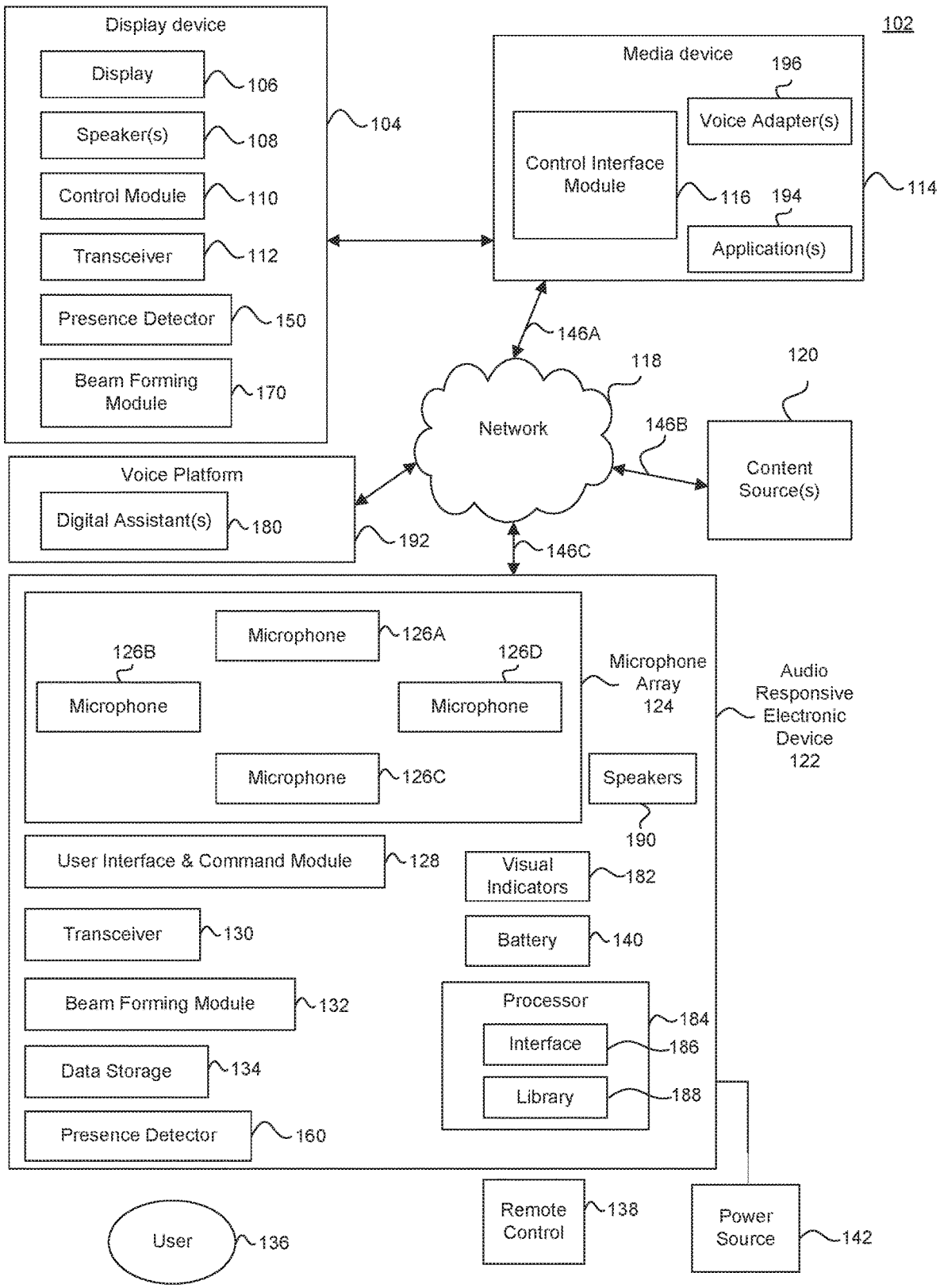
FIG. 1 illustrates a block diagram of a data processing system that includes an audio responsive electronic device, according to some embodiments.

FIG. 1 illustrates a block diagram of a data processing system 102, according to some embodiments. In a non-limiting example, data processing system 102 is a media or home electronics system 102.

The media system 102 may include a display device 104 (e.g. monitors, televisions, computers, phones, tablets, projectors, etc.) and a media device 114 (e.g. streaming devices, multimedia devices, audio/video playback devices, etc.). In some embodiments, the media device 114 can be a part of, integrated with, operatively coupled to, and/or connected to display device 104. The media device 114 can be configured to communicate with network 118. In various embodiments, the network 118 can include, without limitation, wired and/or wireless intranet, extranet, Internet, cellular, Bluetooth and/or any other local, short range, ad hoc, regional, global communications network, as well as any combination thereof.

The media system 102 also includes one or more content sources 120 (also called content servers 120). Content sources 120 may each store music, videos, movies, TV programs, multimedia, images, still pictures, text, graphics, gaming applications, advertisements, software, and/or any other content in electronic form.

The media system 102 may include a user 136 and a remote control 138. Remote control 138 can be any component, part, apparatus or method for controlling media device 114 and/or display device 104, such as a remote control, a tablet, laptop computer, smartphone, on-screen controls, integrated control buttons, or any combination thereof, to name just a few examples.

The media system 102 may also include an audio responsive electronic device 122. In some embodiments herein, the audio responsive electronic device 122 is an audio remote control device. Audio responsive electronic device 122 may receive audio commands from user 136 or another source of audio commands (such as but not limited to the audio of content output by speaker(s) 108 of display device 104). Audio responsive electronic device 122 may transmit control signals corresponding to such audio commands to media device 114, display device 104, digital assistant(s) 180 and/or any other component in system 102, to cause the media device 114, display device 104, digital assistant(s) 180 and/or other component to operate according to the audio commands.

The display device 104 may include a display 106, speaker(s) 108, a control module 110, transceiver 112, presence detector 150, and beam forming module 170. Control module 110 may receive and respond to commands from media device 114, remote control 138 and/or audio responsive electronic device 122 to control the operation of display device 104, such as selecting a source, varying audio and/or video properties, adjusting volume, powering on and off, to name just a few examples. Control module 110 may receive such commands via transceiver 112. Transceiver 112 may operate according to any communication standard or technique, such as infrared, cellular, WIFI, Blue Tooth, to name just a few examples. Transceiver 112 may comprise a plurality of transceivers. The plurality of transceivers may transmit data using a plurality of antennas. For example, the plurality of transceivers may use multiple input multiple output (MIMO) technology.

Presence detector 150 may detect the presence, or near presence of user 136. Presence detector 150 may further determine a position of user 136. For example, presence detector 150 may detect user 136 in a specific quadrant of a room such as a living room. Beam forming module 170 may adjust a transmission pattern of transceiver 112 to establish and maintain a peer to peer wireless network connection to audio responsive electronic device 122.

In some embodiments, presence detector 150 may be a motion sensor, or a plurality of motion sensors. The motion sensor may be passive infrared (PIR) sensor that detects motion based on body heat. The motion sensor may be passive sensor that detects motion based on an interaction of radio waves (e.g., radio waves of the IEEE 802.11 standard) with a person. The motion sensor may be microwave motion sensor that detects motion using radar. For example, the microwave motion sensor may detect motion through the principle of Doppler radar. The motion sensor may be an ultrasonic motion sensor. The motion sensor may be a tomographic motion sensor that detects motion by sensing disturbances to radio waves as they pass from node to node in a wireless network. The motion sensor may be video camera software that analyzes video from a video camera to detect motion in a field of view. The motion sensor may be a sound sensor that analyzes sound from a microphone to detect motion in the surrounding area. As would be appreciated by a person of ordinary skill in the art, the motion sensor may be various other types of sensors, and may use various other types of mechanisms for motion detection or presence detection now known or developed in the future.

In some embodiments, display device 104 may operate in standby mode. Standby mode may be a low power mode. Standby mode may reduce power consumption compared to leaving display device 104 fully on. Display device 104 may also exit standby mode more quickly than a time to perform a full startup. Standby mode may therefore reduce the time a user may have to wait before interacting with display device 104.

In some embodiments, display device 104 may operate in standby mode by turning off one or more of display 106, speaker(s) 108, control module 110, and transceiver 112. The turning off of these one or more components may reduce power usage. In some embodiments, display device 104 may keep on control module 110 and transceiver 112 in standby mode. This may allow display device 104 to receive input from user 136, or another device, via control module 110 and exit standby mode. For example, display device 104 may turn on display 104 and speaker(s) 108 upon exiting standby mode.

In some embodiments, display device 104 may keep on presence detector 150 in standby mode. Presence detector 150 may then monitor for the presence, or near presence, of user 136 by display device 104. In some embodiments, presence detector 150 may cause display device 104 to exit standby mode when presence detector 150 detects the presence, or near presence, of user 136 by display device 104. This is because the presence of user 136 by display device 104 likely means user 136 will be interested in viewing and issuing commands to display device 104.

In some embodiments, presence detector 150 may cause display device 104 to exit standby mode when presence detector 150 detects user 136 in a specific location. In some embodiments, presence detector 150 may be a passive infrared motion sensor that detects motion at a certain distance and angle. In some other embodiments, presence detector 150 may be a passive sensor that detects motion at a certain distance and angle based on an interaction of radio waves (e.g., radio waves of the IEEE 802.11 standard) with a person (e.g., user 136). This determined distance and angle may indicate user 136 is in a specific location. For example, presence detector 150 may detect user 136 being in a specific quadrant of a room. Similarly, presence detector 150 may detect user 136 being directly in front of display device 104. Determining user 136 is in a specific location may reduce the number of times presence detector 150 may inadvertently cause display device 104 to exit standby mode. For example, presence detector 150 may not cause display device 104 to exit standby mode when user 136 is not directly in front of display device 104.

In some embodiments, presence detector 150 may monitor for the presence of user 136 by display device 104 when display device 104 is turned on. Display device 104 may detect the lack of presence of user 136 by display device 104 at a current time using presence detector 150. Display device 104 may then determine the difference between the current time and a past time of a past user presence detection by presence detector 150. Display device 104 may place itself in standby mode if the time difference is greater than a period of time threshold. The period of time threshold may be user configured. In some embodiments, display device 104 may prompt user 136 via display 106 and or speaker(s) 108 to confirm user 136 is still watching and or listening to display device 104. In some embodiments, display device 104 may place itself in standby mode if user 136 does not respond to the prompt in a period of time.

Media device 114 may include a control interface module 116 for sending and receiving commands to/from display device 104, remote control 138 and/or audio responsive electronic device 122.

In some embodiments, media device 114 may include one or more voice adaptor(s) 196. In some embodiments, a voice adaptor 196 may interact with a digital assistant 180 to process an intent for an application 194.

In some embodiments, a digital assistant 180 is an intelligent software agent that performs tasks for user 136. In some embodiments, a digital assistant 180 may analyze received voice input to determine an intent of user 136.

In some embodiments, media device 114 may include one or more application(s) 194. An application 194 may interact with a content source 120 over network 118 to select content, such as a movie, TV show or song. As would be appreciated by a person of ordinary skill in the art, an application 194 may also be referred to as a channel.

In operation, user 136 may use remote control 138 or audio responsive electronic device 122 to interact with media device 114 to select content, such as a movie, TV show or song. In some embodiments, user 136 may use remote control 138 or audio responsive electronic device 122 to interact with an application 194 on media device 114 to select content. Media device 114 requests the selected content from content source(s) 120 over the network 118. In some embodiments, an application 194 requests the selected content from a content source 120. Content source(s) 120 transmits the requested content to media device 114. In some embodiments, content source 120 transmits the requested content to an application 194. Media device 114 transmits the content to display device 104 for playback using display 106 and/or speakers 108. User 136 may use remote control 138 or audio responsive electronic device 122 to change settings of display device 104, such as changing the volume, the source, the channel, display and audio settings, to name just a few examples.

In some embodiments, the user 136 may enter commands on remote control 138 by pressing buttons or using a touch screen on remote control 138, such as channel up/down, volume up/down, play/pause/stop/rewind/fast forward, menu, up, down, left, right, to name just a few examples.

Voice Control Enhancements for Digital Assistant use

In some embodiments, the user 136 may also or alternatively enter commands using audio responsive electronic device 122 by speaking a command. For example, to increase the volume, the user 136 may say "Volume Up." To change to the immediately preceding channel, the user 136 may say "Channel down."

In some embodiments, the user 136 may say a trigger word before saying commands, to better enable the audio responsive electronic device 122 to distinguish between commands and other spoken words. For example, the trigger word may be "Command," "Hey Roku," or "Ok Google." For example, to increase the volume, the user 136 may say "Command Volume Up."

In some embodiments, audio responsive electronic device 122 may select a digital assistant 180 from among a plurality of digital assistants 180 in voice platform 192 to process voice commands. Each respective digital assistant 180 may have its own trigger word and particular functionality. Audio responsive electronic device 122 may select a digital assistant 180 based on a trigger word. Audio responsive electronic device 122 may recognize one or more trigger words associated with the different digital assistants 180.

In some embodiments, the audio responsive electronic device 122 may include a microphone array 124 comprising one or more microphones 126. The audio responsive electronic device 122 may also include a user interface and command module 128, transceiver 130, beam forming module 132, data storage 134, and presence detector 160. The audio responsive electronic device 122 may further include visual indicators 182, speakers 190, and a processor or processing module 184 having an interface 186 and database library 188, according to some embodiments (further described below). In some embodiments, the library 188 may be stored in data storage 134.

In some embodiments, user interface and command module 128 may receive audio input via microphone array 124. The audio input may be from user 136, display device 104 (via speakers 108), or any other audio source in system 102. User interface and command module 128 may analyze the received audio input to recognize trigger words and commands, using any well-known signal recognition techniques, procedures, technologies, etc. The user interface and command module 128 may generate command signals compatible with display device 104 and/or media device 114 corresponding to the recognized commands, and transmit such commands to display device 104 and/or media device 114 via transceiver 130, to thereby cause display device 104 and/or media device 114 to operate according to the commands.

In some embodiments, user interface and command module 128 may transmit the audio input (e.g., voice input) to digital assistant(s) 180 based on a recognized trigger word. The user interface and command module 128 may transmit the audio input to digital assistant(s) 180 via transceiver 130, to thereby cause digital assistant(s) 180 to operate according to the audio input. Transceiver 130 may operate according to any communication standard or technique, such as infrared, cellular, WIFI, Blue Tooth, to name just a few examples. Audio responsive electronic device 122 may be powered by a battery 140, or via an external power source 142 (such as AC power, for example).

In some embodiments, user interface and command module 128 may receive voice input from a user 136 via microphone array 124. In some embodiments, user interface and command module 128 may continuously receive voice input from a user 136.

In some embodiments, user interface and command module 128 may analyze the voice input to recognize trigger words and commands, using any well-known signal recognition techniques, procedures, technologies, etc. In some other embodiments, user interface and command module 128 and a digital assistant 180 in voice platform 192 may analyze the voice input to recognize trigger words and commands. This combined local/remote analysis of the voice input by user interface and command module 128 (local) and digital assistant 180 (remote, or cloud) may improve the speech recognition of the voice input and reduce power usage, network usage, memory usage, and processing time.

In some other embodiments, user interface and command module 128 may stream the voice input to a digital assistant 180 in voice platform 192 via network 118. For example, in some embodiments, user interface and command module 128 may stream the voice input in response to audio responsive electronic device 122 receiving a push-to-talk (PTT) command from a user 136. In this case, user interface and command module 128 may ignore analyzing the voice input to recognize trigger words because reception of the PTT command indicates user 136 is inputting voice commands. Instead, digital assistant 180 in voice platform 192 may analyze the voice input to recognize the trigger words and commands.

In some embodiments, user interface and command module 128 and a digital assistant 180 in voice platform 192 may together analyze the voice input to recognize trigger words and commands. For example, in some embodiments, user interface and command module 128 may preprocess the voice input prior to sending the voice input to a digital assistant 180 in voice platform 192. For example, in some embodiments, user interface and command module 128 may perform one or more of echo cancellation, trigger word detection, and noise cancellation on the voice input. In some embodiments, a digital assistant 180 in voice platform 192 may analyze the preprocessed voice input to determine an intent of a user 136. In some embodiments, an intent may represent a task, goal, or outcome for user 136. For example, user 136 may say "Hey Roku, play jazz on Pandora on my television." In this case, digital assistant 180 may determine that the intent of user 136 is to play jazz music on an application 194 (e.g., the Pandora application) on display device 104.

In some embodiments, user interface and command module 128 may preprocess the voice input using a Digital Signal Processor (DSP). This is because a DSP often has better power efficiency than a general purpose microprocessor since it is designed and optimized for digital signal processing (e.g., audio signal processing). In some other embodiments, user interface and command module 128 may preprocess the voice input using a general purpose microprocessor (e.g., an x86 architecture processor).

In some embodiments, user interface and command module 128 may perform echo cancellation on the voice input. For example, user interface and command module 128 may receive voice input via microphone array 124 from user 136 while loud music is playing in the background (e.g., via speakers 108). This background noise may make it difficult to clearly receive and recognize trigger words and commands in the voice input. In some embodiments, user interface and command module 128 may perform echo cancellation on the voice input to filter out background noise. In some embodiments, user interface and command module 128 may perform echo cancellation on the voice input by subtracting a background audio signal (e.g., the audio signal being output by media system 102 via speakers 108) from the voice input received via microphone array 124. In some embodiments, user interface and command module 128 may perform echo cancellation on the voice input prior to performing trigger word detection. This may enable user interface and command module 128 to more accurately recognize trigger words and commands in the voice input.

In some embodiments, user interface and command module 128 may perform trigger word detection on the voice input. In some embodiments, user interface and command module 128 may continuously perform trigger word detection.

In some embodiments, a trigger word is a short word or saying that may cause subsequent commands to be sent directly to a digital assistant 180 in voice platform 192. A trigger word may enable user interface and command module 128 to distinguish between commands and other spoken words from user 136. In other words, a trigger word may cause user interface and command module 128 to establish a conversation between a digital assistant 180 and a user 136. In some embodiments, a trigger word corresponds to a particular digital assistant 180 in voice platform 192. In some embodiments, different digital assistants 180 are associated with and respond to different trigger words.

In some embodiments, user interface and command module 128 may start a conversation with a digital assistant 180 in voice platform 192 in response to detecting a trigger word in the voice input. In some embodiments, user interface and command module 128 may send the voice input to a digital assistant 180 for the duration of the conversation. In some embodiments, user interface and command module 128 may stop the conversation between the digital assistant 180 and user 136 in response to receiving a stop intent in the voice input from user 136 (e.g., "Hey Roku, Stop").

In some embodiments, user interface and command module 128 may perform trigger word detection on the voice input using reduced processing capability and memory capacity. This is because there may be a small number of trigger words, and the trigger words may be of short duration. For example, in some embodiments, user interface and command module 128 may perform trigger word detection on the voice input using a low power DSP.

In some embodiments, user interface and command module 128 may perform trigger word detection for a single trigger word. For example, user interface and command module 128 may perform speech recognition on the voice input and compare the speech recognition result to the trigger word. If the speech recognition result is the same, or substantially similar to the trigger word, user interface and command module 128 may stream the voice input to a digital assistant 180 in voice platform 192 that is associated with the trigger word. This may reduce the amount of network transmission. This is because user interface and command module 128 may avoid streaming the voice input to a digital assistant 180 in voice platform 192 when the voice input does not contain commands.

As would be appreciated by a person of ordinary skill in the art, user interface and command module 128 may perform speech recognition on the voice input using any well-known signal recognition techniques, procedures, technologies, etc. Moreover, as would be appreciated by a person of ordinary skill in the art, user interface and command module 128 may compare the speech recognition result to the trigger word using various well-known comparison techniques, procedures, technologies, etc.

In some other embodiments, user interface and command module 128 may perform trigger word detection for multiple trigger words. For example, user interface and command module 128 may perform trigger word detection for the trigger words "Hey Roku" and "OK Google." In some embodiments, different trigger words may correspond to different digital assistants 180. This enables a user 136 to interact with different digital assistants 180 using different trigger words. In some embodiments, user interface and command module 128 may store the different trigger words in data storage 134 of the audio responsive electronic device 122.

In some embodiments, user interface and command module 128 may perform trigger word detection for multiple trigger words by performing speech recognition on the voice input. In some embodiments, user interface and command module 128 may compare the speech recognition result to the multiple trigger words in data storage 134. If the speech recognition result is the same or substantially similar to one of the trigger words, user interface and command module 128 may stream the voice input from user 136 to a digital assistant 180 in voice platform 192 that is associated with the trigger word.

In some other embodiments, user interface and command module 128 may send the speech recognition result to a voice adaptor 196. In some other embodiments, user interface and command module 128 may send the speech recognition result to multiple voice adaptors 196 in parallel.

In some embodiments, a voice adaptor 196 may operate with a digital assistant 180. While voice adaptor(s) 196 are shown in media device 114, a person of ordinary skill in the art would understand that voice adaptor(s) 196 may also operate on audio responsive electronic device 122.

In some embodiments, a voice adaptor 196 may compare the speech recognition result to a trigger word associated with the voice adaptor 196. In some embodiments, a voice adaptor 196 may notify user interface and command module 128 that the speech recognition result is the same or substantially similar to the trigger word associated with the voice adaptor 196. If the speech recognition result is the same or substantially similar to the trigger word, user interface and command module 128 may stream the voice input from user 136 to a digital assistant 180 in voice platform 192 that is associated with the trigger word.

In some other embodiments, if the speech recognition result is the same or substantially similar to the trigger word, a voice adaptor 196 may stream the voice input from user 136 to a digital assistant 180 in voice platform 192 that is associated with the trigger word.

In some embodiments, user interface and command module 128 may perform noise cancellation on the voice input. In some embodiments, user interface and command module 128 may perform noise cancellation on the voice input after detecting a trigger word.

For example, in some embodiments, user interface and command module 128 may receive voice input via microphone array 124 from user 136. The voice input, however, may include background noise picked up by microphone array 124. This background noise may make it difficult to clearly receive and recognize the voice input. In some embodiments, user interface and command module 128 may perform noise cancellation on the voice input to filter out this background noise.

In some embodiments, user interface and command module 128 may perform noise cancellation on the voice input using beam forming techniques. For example, audio responsive electronic device 122 may use beam forming techniques on any of its microphones 126 to de-emphasize reception of audio from a microphone in microphone array 124 that is positioned away from user 136.

For example, in some embodiments, user interface and command module 128 may perform noise cancellation on the voice input using beam forming module 132. For example, beam forming module 132 may adjust the reception pattern 204A of the front microphone 126A (and potentially also reception patterns 204D and 204B of the right microphone 126D and the left microphone 126) to suppress or even negate the receipt of audio from display device 104. Beam forming module 132 may perform this functionality using any well-known beam forming technique, operation, process, module, apparatus, technology, etc.

In some embodiments, voice platform 192 may process the preprocessed voice input from audio responsive electronic device 122. In some embodiments, voice platform 192 may include one or more digital assistants 180. In some embodiments, a digital assistant 180 is an intelligent software agent that can perform tasks for user 136. For example, a digital assistant 180 may include, but is not limited to, Amazon Alexa®, Apple Siri®, Microsoft Cortana®, and Google Assistant®. In some embodiments, voice platform 192 may select a digital assistant 180 to process the preprocessed voice input based on a trigger word in the voice input. In some embodiments, a digital assistant 180 may have a unique trigger word.

In some embodiments, voice platform 192 may be implemented in a cloud computing platform. In some other embodiments, voice platform 192 may be implemented on a server computer. In some embodiments, voice platform 192 may be operated by a third-party entity. In some embodiments, audio responsive electronic device 122 may send the preprocessed voice input to voice platform 192 at the third-party entity based on a detected trigger word and configuration information provided by a voice adaptor 196.

In some embodiments, voice platform 192 may perform one or more of secondary trigger word detection, automated speech recognition (ASR), natural language processing (NLP), and intent determination. The performance of these functions by voice platform 192 may enable audio responsive electronic device 122 to utilize a low power processor (e.g., a DSP) with reduced memory capacity while still providing reliable voice command control.

In some embodiments, voice platform 192 may perform a secondary trigger word detection on the received voice input. For example, voice platform 192 may perform a secondary trigger word detection when user interface and command module 128 detects a trigger word with a low confidence value. This secondary trigger word detection may improve trigger word detection accuracy.

In some embodiments, voice platform 192 may select a digital assistant 180 based on the detected trigger word. In some embodiments, voice platform 192 may select a digital assistant 180 based on lookup table that maps trigger words to a particular digital assistant 180. Voice platform 192 may then dispatch the preprocessed voice input to the selected digital assistant 180 for processing.

In some embodiments, a digital assistant 180 may process the preprocessed voice input as commands. In some embodiments, a digital assistant 180 may provide a response to audio response electronic device 122 via network 118 for delivery to user 136.

Figure 11:
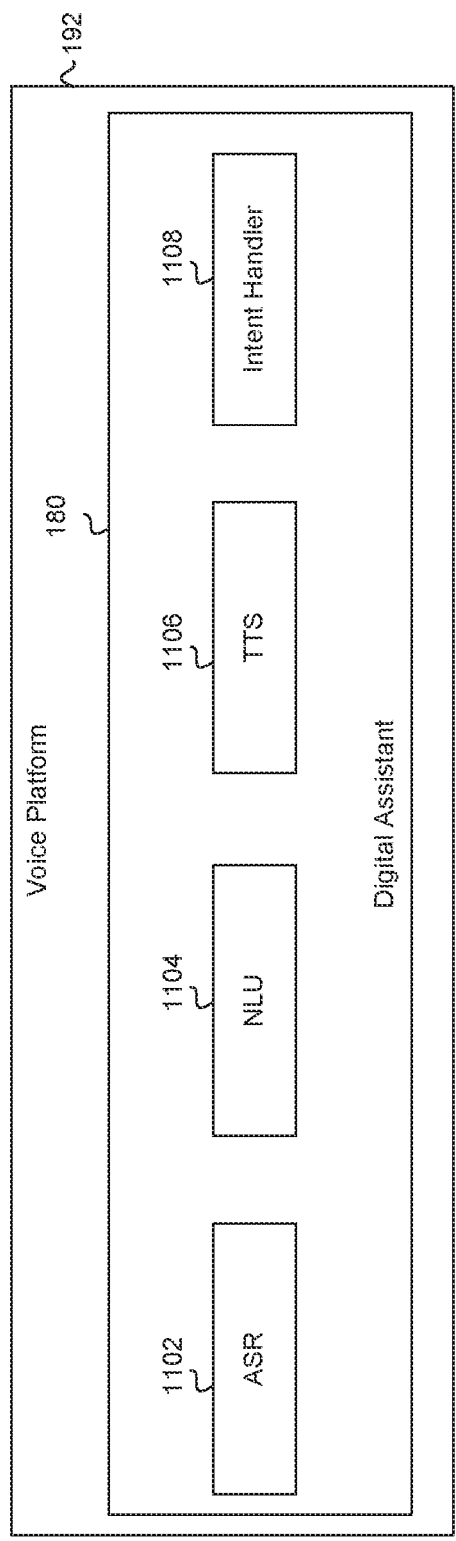
FIG. 11 illustrates a block diagram of a voice platform that analyzes voice input from an audio responsive electronic device, according to some embodiments.

FIG. 11 illustrates a block diagram of a voice platform 192 that analyzes voice input from audio responsive electronic device 122, according to some embodiments. FIG. 11 is discussed with reference to FIG. 1, although this disclosure is not limited to that example embodiment. In the example of FIG. 11, voice platform 192 includes a digital assistant 180 and an intent handler 1108. In the example of FIG. 11, digital assistant 180 includes an automated speech recognizer (ASR) 1102, natural language unit (NLU) 1104, and a text-to-speech (TTS) unit 1106. In some other embodiments, voice platform 192 may include a common ASR 1102 for one or more digital assistants 180.

In some embodiments, digital assistant 180 receives the preprocessed voice input from audio responsive electronic device 122 at ASR 1102. In some embodiments, digital assistant 180 may receive the preprocessed voice input as a pulse-code modulation (PCM) voice stream. As would be appreciated by a person of ordinary skill in the art, digital assistant 180 may receive the preprocessed voice input in various other data formats.

In some embodiments, ASR 1102 may detect an end-of-utterance in the preprocessed voice input. In other words, ASR 1102 may detect when a user 136 is done speaking. This may reduce the amount of data to analyze by NLU 1104.

In some embodiments, ASR 1102 may determine which words were spoken in the preprocessed voice input. In response to this determination, ASR 1102 may output text results for the preprocessed voice input. Each text result may have a certain level of confidence. For example, in some embodiments, ASR 1102 may output a word graph for the preprocessed voice input (e.g., a lattice that consists of word hypotheses).

In some embodiments, NLU 1104 receives the text results from ASR 1102. In some embodiments, NLU 1104 may generate a meaning representation of the text results through natural language understanding techniques as would be appreciated by a person of ordinary skill in the art.

In some embodiments, NLU 1104 may generate an intent through natural language understanding techniques as would be appreciated by a person of ordinary skill in the art. In some embodiments, an intent may be a data structure that represents a task, goal, or outcome requested by a user 136. For example, a user 136 may say "Hey Roku, play jazz on Pandora on my television." In response, NLU 1104 may determine that the intent of user 136 is to play jazz on an application 194 (e.g., the Pandora application) on display device 104. In some embodiments, the intent may be specific to NLU 1104. This is because a particular digital assistant 180 may provide NLU 1104.

In some embodiments, intent handler 198 may receive an intent from NLU 1104. In some embodiments, intent handler 1108 may convert the intent into a standard format. For example, in some embodiments, intent handler 1108 may convert the intent into a standard format for media device 114.

In some embodiments, intent handler 1108 may convert the intent into a fixed number of intent types. In some embodiments, this may provide faster intent processing for media device 114.

In some embodiments, intent handler 1108 may refine an intent based on information in a cloud computing platform. For example, in some embodiments, user 136 may say "Hey Roku, play jazz." In response, NLU 1104 may determine that the intent of user 136 is to play jazz. Intent handler 1108 may further determine an application for playing jazz. For example, in some embodiments, intent handler 1108 may search a cloud computing platform for an application that plays jazz. Intent handler 1108 may then refine the intent by adding the determined application to the intent.

In some embodiments, intent handler 1108 may add other types of metadata to an intent. For example, in some embodiments, intent handler 1108 may resolve a device name in an intent. For example, intent handler 1108 may refine an intent of "watch NBA basketball on my TV" to an intent of "watch NBA basketball on <ESN=7H1642000026>".

In some embodiments, intent handler 1108 may add search results to an intent. For example, in response to "Show me famous movies", intent handler 1108 may add search results such as "Star Wars" and "Gone With the Wind" to the intent.

In some embodiments, voice platform 192 may overrule the selected digital assistant 180. For example, voice platform 192 may select a different digital assistant 180 than is normally selected based on the detected trigger word. Voice platform 192 may overrule the selected digital assistant 180 because some digital assistants 180 may perform certain types of tasks better than other digital assistants 180. For example, in some embodiments, voice platform 192 may determine that the digital assistant 180 selected based on the detected trigger word does not perform the requested task as well as another digital assistant 180. In response, voice platform 192 may dispatch the voice input to the other digital assistant 180.

In some embodiments, voice platform 192 may overrule the selected digital assistant 180 based on crowdsourced data. In some embodiments, voice platform 192 may track what digital assistant 180 is most often used for certain types tasks. In some other embodiments, a crowdsource server may keep track of which digital assistants 180 are used for certain types of tasks. As would be appreciated by a person of ordinary skill in the art, voice platform 192 may track the usage of different digital assistants 180 using various criteria including, but not limited to, time of day, location, and frequency. In some embodiments, voice platform 192 may select a different digital assistant 180 based on this tracking. Voice platform 192 may then dispatch the voice input to this newly selected digital assistant 180 for processing.

For example, in some embodiments, a majority of users 136 may use a digital assistant 180 from Google, Inc. to look up general information. However, a user 136 may submit a voice input of "Hey Siri, what is the capital of Minnesota?" that would normally be processed by Apple Inc.'s Siri® digital assistant 180 due to the user 136's use of the trigger word "Hey Siri." But in some embodiments, voice platform 192 may consult a crowdsource server to determine if another digital assistant 180 should be used instead. The voice platform 192 may then send the voice input to the Google digital assistant 180 (rather than Siri), if the crowdsource data indicates that typically such general information queries are processed by the Google digital assistant 180.

In some embodiments, the crowdsource server may record the user 136's original request for Siri to perform the lookup. For example, the crowdsource server may increment a Siri counter relating to general information queries by one. In the future, if a majority of users request Siri to process general information queries (such that Siri's counter becomes greater than Google's and the counters of other digital assistants 180), then the voice platform 180 will dispatch such queries to Siri for processing (rather than the Google digital assistant).

In some embodiments, voice platform 192 may send a generated intent to media device 114 for processing. For example, in some embodiments, a digital assistant 180 in voice platform 192 may send a generated intent to media device 114 for processing.

In some embodiments, a voice adaptor 196 may process an intent received from a digital assistant 180. For example, in some embodiments, a voice adaptor 196 may determine an application 194 for handling the intent.

In some embodiments, a voice adaptor 196 may route an intent to an application 194 based on the intent indicating that application 194 should process the intent. For example, user 136 may say "Hey Roku, play jazz on Pandora". The resulting intent may therefore indicate that it should be handled using a particular application 194 (e.g., the Pandora application).

In some other embodiments, a particular application 194 may not be specified in an intent. In some embodiments, a voice adaptor 196 may route the intent to an application 194 based on other criteria. For example, in some embodiments, a voice adaptor 196 may route the intent to an application 194 based on a trigger word. In some embodiments, the digital assistant handler may route the intent to an application 194 based on a fixed rule (e.g., send all podcasts to the Tunein application 194). In some embodiments, a voice adaptor 196 may route the intent to an application 194 based on a user-configured default application (e.g., a default music application 194). In some embodiments, a voice adaptor 196 may route the intent to an application 194 based on the results of a search (e.g., the Spotify application 194 is the only application that has Sonata No. 5).

In some embodiments, digital assistant 180 may determine that it cannot handle the commands in the preprocessed voice input. In response, in some embodiments, digital assistant 180 may transmit a response to audio responsive electronic device 122 indicating that digital assistant 180 cannot handle the commands. In some other embodiments, digital assistant 180 may transmit the response to media device 114.

In some embodiments, digital assistant 180 may determine that another digital assistant 180 can handle the voice commands. In response, voice platform 192 may send the preprocessed voice input to the other digital assistant 180 for handling.

In some embodiments, TTS 1106 may generate an audio response in response to generation of an intent. In some embodiments, TTS 1106 may generate an audio response to being unable to generate an intent.

Figure 12:
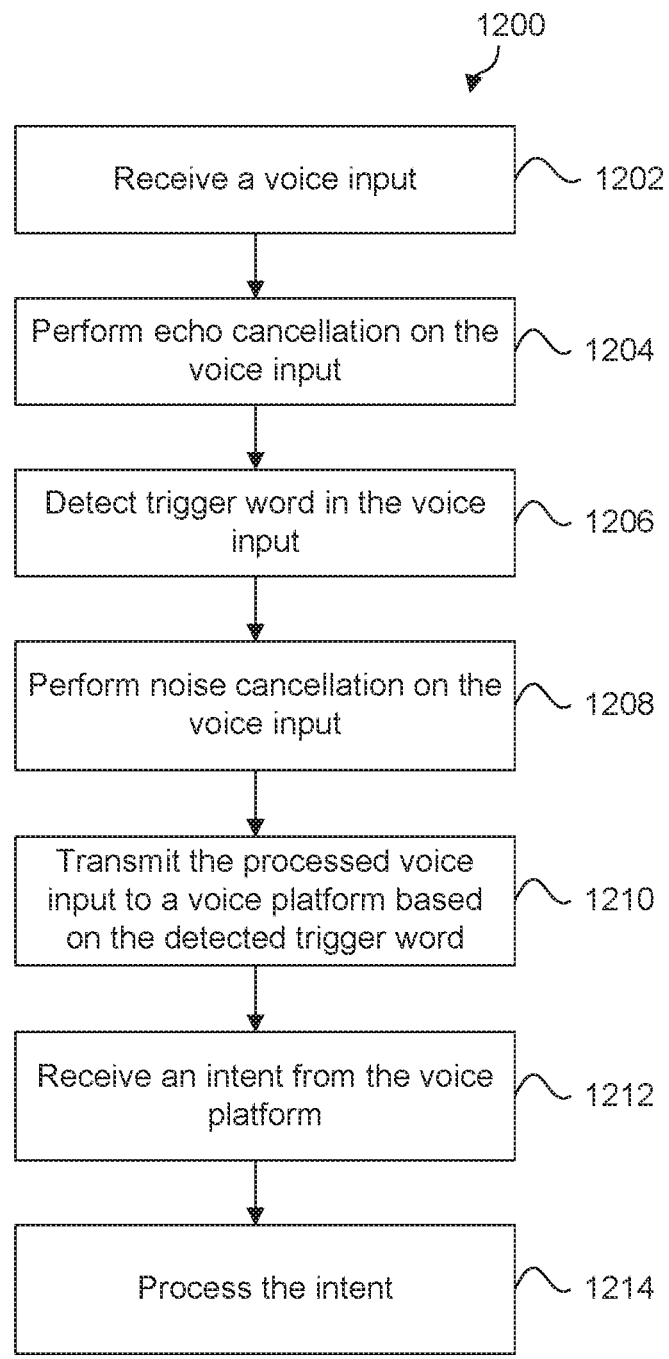
FIG. 12 illustrates a method for performing speech recognition for a digital assistant, according to some embodiments.

FIG. 12 illustrates a method 1200 for performing speech recognition for a digital assistant, according to some embodiments. Method 1200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 12, as will be understood by a person of ordinary skill in the art. Method 1200 is discussed with respect to FIGS. 1 and 11.

In 1202, audio responsive electronic device 122 receives a voice input from user 136 via microphone array 124.

In 1204, user interface and command module 128 optionally performs echo cancellation on voice input. For example, in some embodiments, user interface and command module 128 may subtract a background audio signal (e.g., an audio signal being output by media system 102 via speakers 108) from the voice input received via microphone array 124.

In 1206, user interface and command module 128 detects a trigger word in the voice input. In some embodiments, user interface and command module 128 may perform trigger word detection for a single trigger word. In some other embodiments, user interface and command module 128 may perform trigger word detection for multiple trigger words.

In some embodiments, user interface and command module 128 may detect a trigger word by performing speech recognition on the voice input and compare the speech recognition result to the trigger word.

In some embodiments, user interface and command module 128 may perform trigger word detection on the voice input using reduced processing capability and memory capacity. This is because there may be a small number of trigger words, and the trigger words may be of short duration.

In 1208, user interface and command module 128 optionally performs noise cancellation on the voice input. In some embodiments, user interface and command module 128 performs noise cancellation on the voice input using beam forming module 132. For example, beam forming module 132 may adjust the reception pattern at microphone array 124 to emphasize reception of audio from user 136.

In 1210, user interface and command module 128 transmits the processed voice input to voice platform 192 based on the detection of the trigger word in the voice input.

In some embodiments, if user interface and command module 128 detects a trigger word in the voice input, user interface and command module 128 may stream the voice input to a digital assistant 180 in voice platform 192 that is associated with the trigger word. In some other embodiments, if user interface and command module 128 detects a trigger word in the voice input, user interface and command module 128 may provide the voice input to a voice adaptor 196 which streams the voice input to a digital assistant 180 in voice platform 192 that is associated with the trigger word.

In some embodiments, voice platform 192 may perform a secondary trigger word detection on the received voice input. In some embodiments, voice platform 192 may select a digital assistant 180 based on the detected trigger word. In some embodiments, voice platform 192 may select a digital assistant 180 based on lookup table that maps trigger words to a particular digital assistant 180. Voice platform 192 may then dispatch the preprocessed voice input to the selected digital assistant 180 for processing.

In some embodiments, voice platform 192 may convert the voice input into a text input using ASR 1102 in digital assistant 180. In some embodiments, voice platform 192 may convert the text input into an intent using NLU 1104 in digital assistant 180. In some embodiments, voice platform 192 may convert the intent into a standard format using intent handler 1108. In some embodiments, intent handler 1108 may refine the intent based on information in a cloud computing platform.

In 1212, media device 114 receives an intent for the voice input from the voice platform 192. In some embodiments, the audio responsive electronic device 122 may receive the intent for the voice input from the voice platform 192.

In 1214, media device 114 processes the intent. For example, in some embodiments, a voice adaptor 196 on media device 114 may process the intent. In some other embodiments, when the audio responsive electronic device 122 receives the intent, it sends the intent to a voice adaptor 196 on media device 114. The voice adaptor 196 may then process the intent.

In some embodiments, voice adaptor 196 may route the intent to an application 194 for handling based on the intent indicating that application 194 should process the intent. In some other embodiments, a voice adaptor 196 may route the intent to an application 194 based on a fixed rule, user-configured default application, or the results of a search.

Figure 13:
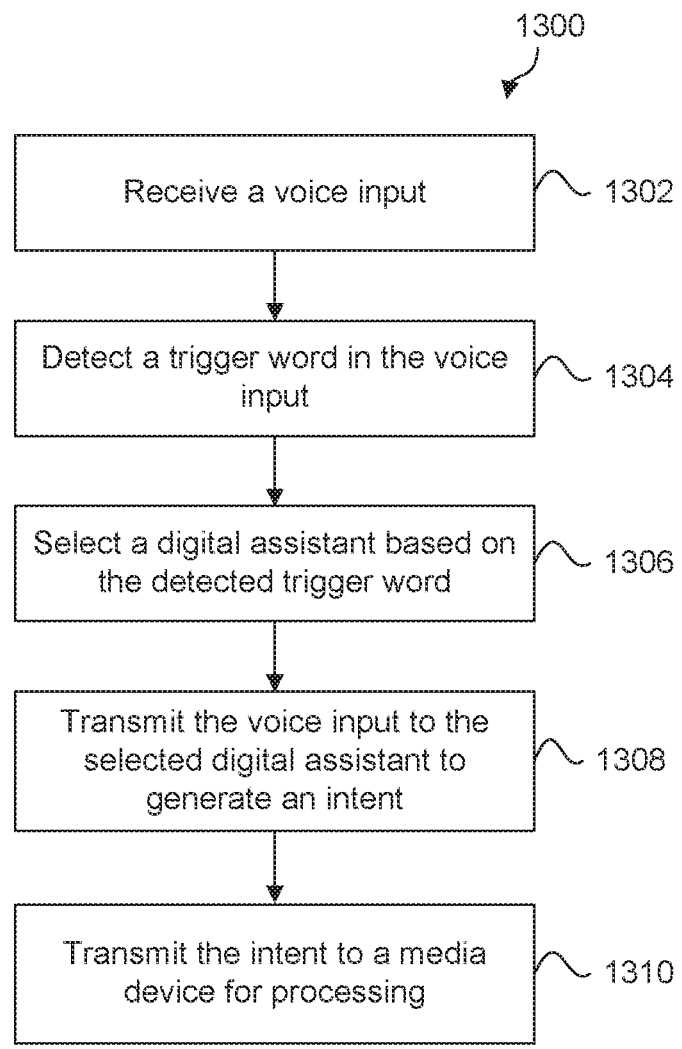
FIG. 13 illustrates a method for performing speech recognition for multiple digital assistants, according to some embodiments.

FIG. 13 illustrates a method 1300 for performing speech recognition for multiple digital assistants each having one or more unique trigger words, according to some embodiments. Method 1300 can be performed by processing logic that can comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 13, as will be understood by a person of ordinary skill in the art. Method 1300 is discussed with respect to FIGS. 1 and 11.

In 1302, voice platform 192 receives a voice input from audio responsive electronic device 122.

In 1304, voice platform 192 detects a trigger word in the voice input from audio responsive electronic device 122.

In 1306, voice platform 192 selects a digital assistant 108 from multiple digital assistants 108 based on the detected trigger word. In some embodiments, voice platform 192 may select a digital assistant 180 based on a lookup table that maps different trigger words to the digital assistants 180.

In 1308, voice platform 192 dispatches the voice input to the selected digital assistant 108 to generate an intent. For example, in some embodiments, the selected digital assistant 108 performs automated speech recognition using ASR 1102 on the voice input. The selected digital assistant 108 then performs natural language processing (NLP) on the speech recognition result using NLU 1104 to generate the intent. In some embodiments, voice platform 192 may convert the intent into a standard format intent using intent handler 1108. In some embodiments, intent handler 1108 may refine the intent by adding additional information to the intent.

In 1310, voice platform 192 transmits the intent to media device 114 for processing. In some other embodiments, the audio responsive electronic device 122 may receive the intent. The audio responsive electronic device 122 may the transmit the intent to media device 114 for processing.

In some embodiments, a voice adaptor 196 associated with the selected digital assistant 108 processes the intent at media device 114. In some embodiments, voice adaptor 196 may route the intent to an application 194 based on the intent indicating that application 194 should process the intent. In some other embodiments, voice adaptor 196 may route the intent to an application 194 based on a fixed rule, user-configured default application, or the results of a search.

Enhancements to a Media System Based on Presence Detection

In some embodiments, similar to presence detector 150 in display device 104, presence detector 160 in the audio responsive electronic device 122 may detect the presence, or near presence of a user. Presence detector 160 may further determine a position of a user. In some embodiments, presence detector 160 may be a passive infrared motion sensor that detects motion at a certain distance and angle. In some other embodiments, presence detector 160 may be a passive sensor that detects motion at a certain distance and angle based on an interaction of radio waves (e.g., radio waves of the IEEE 802.11 standard) with a person (e.g., user 136). This determined distance and angle may indicate user 136 is in a specific location. For example, presence detector 160 may detect user 136 in a specific quadrant of a room such as a living room. As would be appreciated by a person of ordinary skill in the art, remote control 138 may similarly include a presence detector 160.

In some embodiments, presence detector 160 may be a motion detector, or a plurality of motion sensors. The motion sensor may be passive infrared (PIR) sensor that detects motion based on body heat. The motion sensor may be passive sensor that detects motion based on an interaction of radio waves (e.g., radio waves of the IEEE 802.11 standard) with a person. The motion sensor may be microwave motion sensor that detects motion using radar. For example, the microwave motion sensor may detect motion through the principle of Doppler radar. The motion sensor may be an ultrasonic motion sensor. The motion sensor may be a tomographic motion sensor that detects motion by sensing disturbances to radio waves as they pass from node to node in a wireless network. The motion sensor may be video camera software that analyzes video from a video camera to detect motion in a field of view. The motion sensor may be a sound sensor that analyzes sound from a microphone to detect motion in the surrounding area. As would be appreciated by a person of ordinary skill in the art, the motion sensor may be various other types of sensors, and may use various other types of mechanisms for motion detection or presence detection now known or developed in the future.

In some embodiments, similar to display device 104, audio responsive electronic device 122 may operate in standby mode. Standby mode may be a low power mode. Standby mode may reduce power consumption compared to leaving audio responsive electronic device 122 fully on. Audio responsive electronic device 122 may also exit standby mode more quickly than a time to perform a full startup. Standby mode may therefore reduce the time user 136 may have to wait before interacting with audio responsive electronic device 122.

In some embodiments, audio responsive electronic device 122 may operate in standby mode by turning off one or more of microphone array 124, user interface and command module 128, transceiver 130, beam forming module 132, data storage 134, visual indicators 182, speakers 190, and processing module 184. The turning off of these one or more components may reduce power usage. In some embodiments, audio responsive electronic device 122 may keep on microphone array 124 and or transceiver 130 in standby mode. This may allow audio responsive electronic device 122 to receive input from user 136, or another device, via microphone array 124 and or transceiver 130 and exit standby mode. For example, audio responsive electronic device 122 may turn on user interface and command module 128, beam forming module 132, data storage 134, visual indicators 182, speakers 190, and processing module 184 upon exiting standby mode.

In some other embodiments, audio responsive electronic device 122 may keep on presence detector 160, and turn off all other components in standby mode. Presence detector 160 may then monitor for the presence, or near presence, of user 136 by audio responsive electronic device 122. In some embodiments, presence detector 160 may cause audio responsive electronic device 122 to exit standby mode when presence detector 160 detects the presence, or near presence, of user 136 by audio responsive electronic device 122. This is because the presence of user 136 by audio responsive electronic device 122 likely means user 136 will be interested in interacting with audio responsive electronic device 122.

In some embodiments, presence detector 160 may cause audio responsive electronic device 122 to exit standby mode when presence detector 160 detects user 136 in a specific location. For example, presence detector 160 may detect user 136 being in a specific quadrant of a room. Similarly, presence detector 160 may detect user 136 within a threshold distance (e.g., 3 feet) of audio responsive electronic device 122. This may reduce the number of times presence detector 160 may inadvertently cause audio responsive electronic device 122 to exit standby mode. For example, presence detector 160 may not cause audio responsive electronic device 122 to exit standby mode when a user is not within a threshold distance of audio responsive electronic device 122.

In some embodiments, presence detector 160 may monitor for the presence of user 136 by audio responsive electronic device 122 when audio responsive electronic device 122 is turned on. Audio responsive electronic device 122 may detect the lack of presence of user 136 by audio responsive electronic device 122 at a current time using presence detector 160. Audio responsive electronic device 122 may then determine the difference between the current time and a past time of a past user presence detection by presence detector 160. Audio responsive electronic device 122 may place itself in standby mode if the time difference is greater than a period of time threshold. The period of time threshold may be user configured. In some embodiments, audio responsive electronic device 122 may prompt user 136 via visual indicators 182 and or speakers 190 to confirm user 136 does not plan to interact with audio responsive electronic device 122 in the near future. In some embodiments, audio responsive electronic device 122 may place itself in standby mode if user 136 does not respond to the prompt in a period of time. For example, audio responsive electronic device 122 may place itself in standby mode if user 136 does not click a button on, or issue a voice command to, audio responsive electronic device 122.

In some embodiments, audio responsive electronic device 122 may automatically turn off microphone array 124 after a period of time. This may reduce power consumption. In some embodiments, presence detector 160 may monitor for the presence of user 136 by audio responsive electronic device 122 when audio responsive electronic device 122 is turned on.

Audio responsive electronic device 122 may detect the lack of presence of user 136 by audio responsive electronic device 122 at a current time using presence detector 160. Audio responsive electronic device 122 may then determine the difference between the current time and a past time of a past user presence detection by presence detector 160. Audio responsive electronic device 122 may turn off microphone array 124 if the time difference is greater than a period of time threshold. The period of time threshold may be user configured. In some embodiments, audio responsive electronic device 122 may prompt user 136 via visual indicators 182 and or speakers 190 to confirm user 136 is not present, or does not plan to issue voice commands to microphone array 124 in the near future. In some embodiments, audio responsive electronic device 122 may turn off microphone array 124 if user 136 does not respond to the prompt in a period of time. For example, audio responsive electronic device 122 may turn off microphone array 124 if user 136 does not click a button on, or issue a voice command to, audio responsive electronic device 122.

In some embodiments, audio responsive electronic device 122 may automatically turn on microphone array 124 after detecting the presence of user 136. In some embodiments, audio responsive electronic device 122 may turn on microphone array 124 when presence detector 150 detects user 136 in a specific location. For example, presence detector 160 may detect user 136 being in a specific quadrant of a room. Similarly, presence detector 160 may be a proximity detector that detects user 136 is within a threshold distance (e.g., 3 feet) of audio responsive electronic device 122. This may reduce the number of times presence detector 160 may inadvertently cause audio responsive electronic device 122 to turn on microphone array 124. For example, audio responsive electronic device 122 may not turn on microphone array 124 when user 136 is not within a threshold distance of audio responsive electronic device 122.

In some embodiments, audio responsive electronic device 122 may automatically turn on transceiver 130 after detecting the presence of user 136. In some embodiments, this may reduce the amount of time to setup a peer to peer wireless networking connection between the audio responsive electronic device 122 and display device 104. In some other embodiments, this may reduce the amount of time to setup a peer to peer wireless networking connection between the audio responsive electronic device 122 and media device 114. For example, audio responsive electronic device 122 may automatically establish setup, or reestablish, the peer to peer wireless networking connection in response to turning on transceiver 130. In some embodiments, audio responsive electronic device 122 may automatically send a keep alive message over the peer to peer wireless network connection to display device 104 after detecting the presence of user 136. The keep alive message may ensure that the peer to peer wireless network connection is not disconnected due to inactivity.

In some embodiments, audio responsive electronic device 122 may turn on transceiver 130 when presence detector 150 detects user 136 in a specific location. For example, presence detector 160 may detect user 136 being in a specific quadrant of a room. Similarly, presence detector 160 may detect user 136 within a threshold distance (e.g., 3 feet) of audio responsive electronic device 122. This may reduce the number of times presence detector 160 may inadvertently cause audio responsive electronic device 122 to turn on transceiver 130. For example, audio responsive electronic device 122 may not turn on transceiver 130 when user 136 is not within a threshold distance of audio responsive electronic device 122.

As would be appreciated by a person of ordinary skill in the art, other devices in system 102 may be placed in standby mode. For example, media device 114 may be placed in standby mode. For example, media device 114 may turn off control interface module 116 when being placed into standby mode. Moreover, as would be appreciated by a person of ordinary skill in the art, presence detector 150 or presence detector 160 may cause these other devices to enter and exit standby mode as described herein. For example, presence detector 150 or presence detector 160 may cause these other devices to turn on one or more components in response to detecting the presence of user 136. Similarly, presence detector 150 or presence detector 160 may cause these other devices to turn on one or more components in response to detecting user 136 in a specific location.

In some embodiments, display device 104 may establish a peer to peer wireless network connection with audio responsive electronic device 122 using transceiver 112. In some embodiments, the peer to peer wireless network connection may be WiFi Direct connection. In some other embodiments, the peer to peer wireless network connection may be a Bluetooth connection. As would be appreciated by a person of ordinary skill in the art, the peer to peer wireless network connection may be implemented using various other network protocols and standards.

In some embodiments, display device 104 may send commands to, and receive commands from, audio responsive electronic device 122 over this peer to peer wireless network connection. These commands may be intended for media device 114. In some embodiments, display device 104 may stream data from media device 114 to audio responsive electronic device 122 over this peer to peer wireless network connection. For example, display device 104 may stream music data from media device 114 to audio responsive electronic device 122 for playback using speaker(s) 190.

In some embodiments, display device 104 may determine the position of user 136 using presence detector 150, since user 136 may be considered to be at the same location as audio responsive electronic device 122. For example, presence detector 150 may detect user 136 being in a specific quadrant of a room.

In some embodiments, beam forming module 170 in display device 104 may use beam forming techniques on transceiver 112 to emphasize a transmission signal for the peer to peer wireless network connection for the determined position of the audio responsive electronic device 122. For example, beam forming module 170 may adjust the transmission pattern of transceiver 112 to be stronger at the position of the audio responsive electronic device 122 using beam forming techniques. Beam forming module 170 may perform this functionality using any well known beam forming technique, operation, process, module, apparatus, technology, etc.

Figure 2:
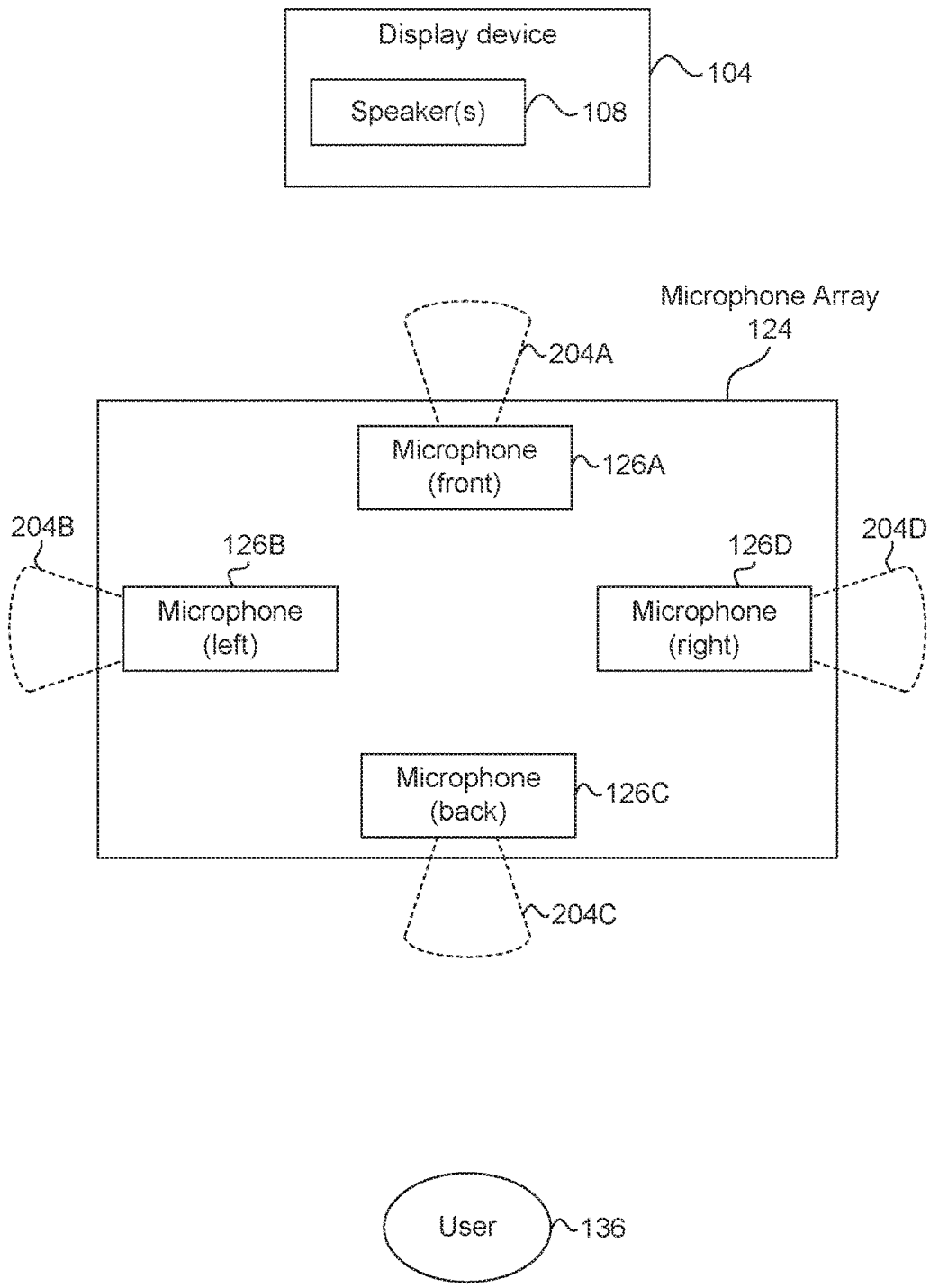
FIG. 2 illustrates a block diagram of a microphone array having a plurality of microphones, shown oriented relative to a display device and a user, according to some embodiments.

FIG. 2 illustrates a block diagram of microphone array 124 of the audio responsive electronic device 122, shown in an example orientation relative to the display device 104 and the user 136, according to some embodiments. In the example of FIG. 2, the microphone array 124 includes four microphones 126A-126D, although in other embodiments the microphone array 124 may include any number of microphones 126.

In the example of FIG. 2, microphones 126 are positioned relative to each other in a general square configuration. For illustrative purposes, and not limiting, microphone 126A may be considered at the front; microphone 126D may be considered at the right; microphone 126C may be considered at the back; and microphone 126B may be considered at the left. It is noted that such example designations may be set according to an expected or designated position of user 136 or display device 104, in some embodiments.

As shown in the example of FIG. 2, the user 136 is positioned proximate to the back microphone 126C, and the display device 104 is positioned proximate to the front microphone 126A.

Each microphone 126 may have an associated reception pattern 204. As will be appreciated by persons skilled in the relevant art(s), a microphone's reception pattern reflects the directionality of the microphone, that is, the microphone's sensitivity to sound from various directions. As persons skilled in the relevant art(s) will appreciate, some microphones pick up sound equally from all directions, others pick up sound only from one direction or a particular combination of directions.

In the example orientation of FIG. 2, the front microphone 126A receives audio from speakers 108 of display 104 most clearly, given its reception pattern 204A and relative to the other microphones 204B-204D. The back microphone 126C receives audio from user 136 most clearly, given its reception pattern 204C and relative to the other microphones 126A, 126B and 126D.

Figure 3:
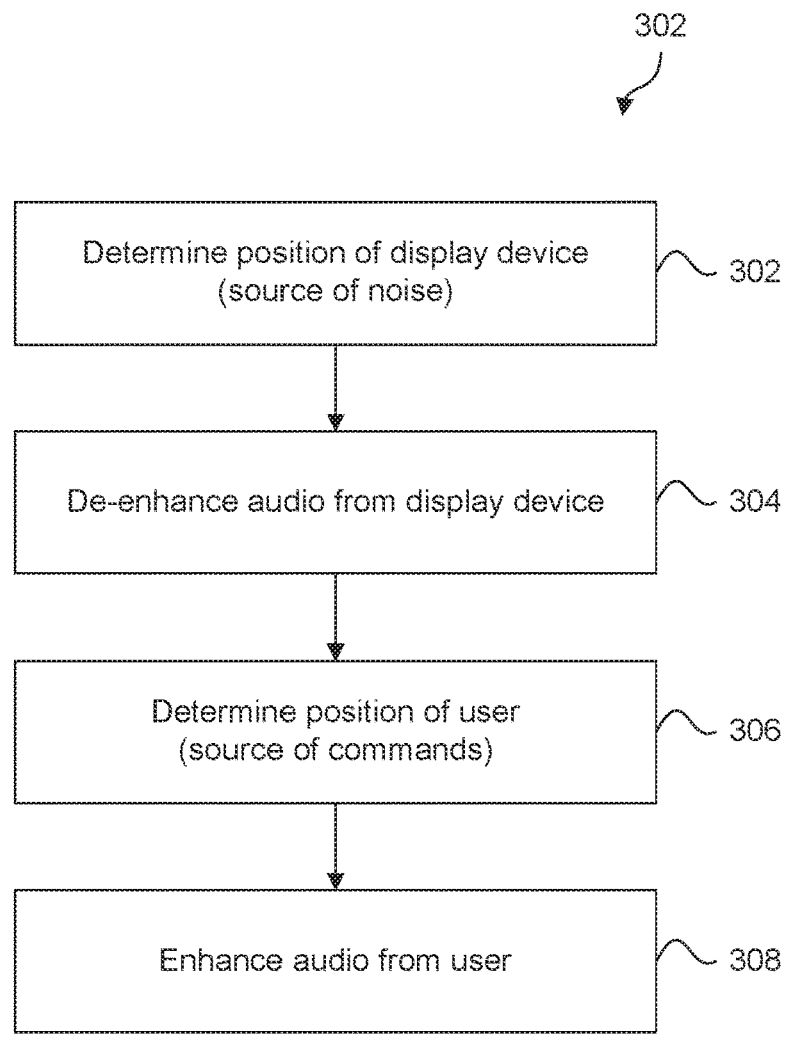
FIG. 3 illustrates a method for enhancing audio from a user and de-enhancing audio from a display device and/or other noise sources, according to some embodiments.

FIG. 3 illustrates a method 302 for enhancing audio from a user (and/or other sources of audio commands) and de-enhancing audio from a display device (and/or other noise sources), according to some embodiments. Method 302 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

For illustrative and non-limiting purposes, method 302 shall be described with reference to FIGS. 1 and 2. However, method 302 is not limited to those examples.

In 302, the position of a source of noise may be determined. For example, user interface and command module 128 of the audio responsive electronic device 122 may determine the position of display device 104. In embodiments, display device 104 may be considered a source of noise because audio commands may be expected from user 136 during times when display device 104 is outputting audio of content via speakers 108.

In some embodiments, display device 104 may determine the position of user 136 using presence detector 150, since user 136 may be considered to have the same position as audio responsive electronic device 122. Display device 104 may then transmit position information to audio responsive electronic device 122 that defines the relative position of display device 104 to user 136. In some embodiments, audio responsive electronic device 122 may determine the position of display device 104 based on this position information.

In some embodiments, user 136 may enter configuration settings specifying where the display device 104 is positioned proximate to one of the microphones 126 (such as the front microphone 126A in the example orientation of FIG. 2). Such configuration settings may be stored in data storage 134 of the audio responsive electronic device 122. Accordingly, in 302, user interface and command module 128 may access the configuration settings in data storage 134 to determine the position of display device 104.

In 304, audio from the source of noise may be de-enhanced or suppressed. For example, user interface and command module 128 may deactivate microphones 126 proximate to the display device 104 and having reception patterns 204 most likely to receive audio from display device 104. Specifically, in the example of FIG. 2, user interface and command module 128 may deactivate the front microphone 126A, and potentially also the right microphone 126D and/or the left microphone 126B.

Alternatively or additionally, beam forming module 132 in the audio responsive electronic device 122 may use beam forming techniques on any of its microphones 126 to de-emphasize reception of audio from the display device 104. For example, beam forming module 132 may adjust the reception pattern 204A of the front microphone 126A (and potentially also reception patterns 204D and 204B of the right microphone 126D and the left microphone 126) to suppress or even negate the receipt of audio from display device 104. Beam forming module 132 may perform this functionality using any well known beam forming technique, operation, process, module, apparatus, technology, etc.

Alternatively or additionally, user interface and command module 128 may issue a command via transceiver 130 to display device 104 to mute display device 104. In some embodiments, user interface and command module 128 may mute display device 104 after receiving and recognizing a trigger word. The user interface and command module 128 may operate in this manner, since user interface and command module 128 expects to receive one or more commands from user 136 after receiving a trigger word.

Figure 4:
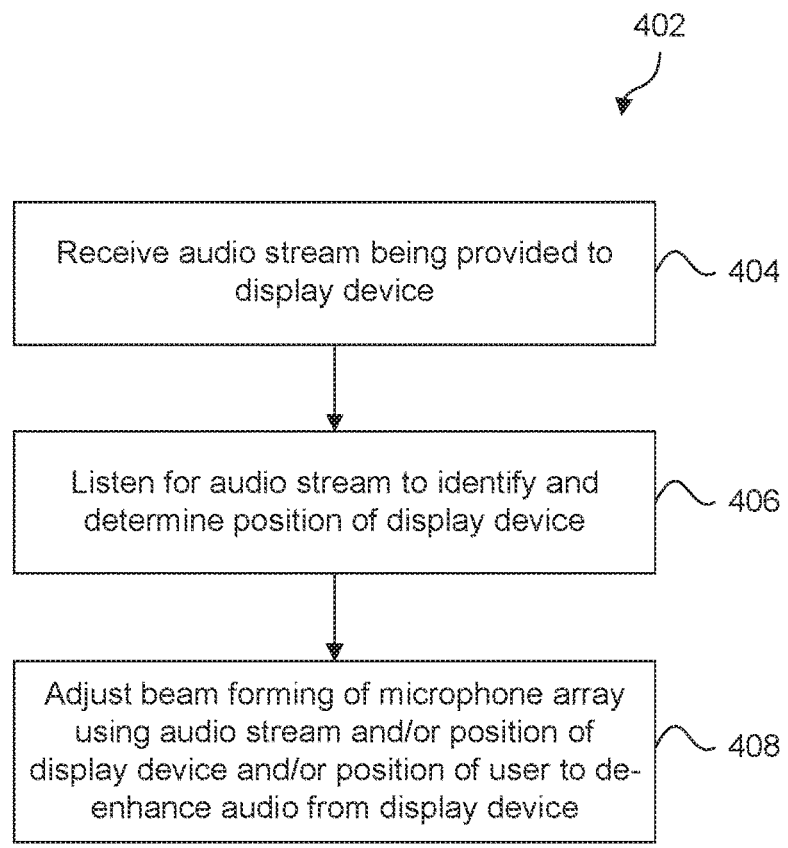
FIG. 4 illustrates a method for de-enhancing audio from a display device and/or other noise sources, according to some embodiments.

FIG. 4 illustrates an alternative or additional embodiment for implementing elements 302 and 304 in FIG. 3. In 404, user interface and command module 128 in the audio responsive electronic device 122 receives the audio stream of content being also provided to display device 104 from media device 114, for play over speakers 108. User interface and command module 128 may receive this audio stream from media device 114 via network 118 using, for example, WIFI, Blue Tooth, cellular, to name a few communication examples. User interface and command module 128 could also receive this audio stream from content source(s) 120 over network 118.

In 406, user interface and command module 128 may listen for audio received via microphone array 124 that matches the audio stream received in 404, using well known signal processing techniques and algorithms.

In 408, user interface and command module 128 may adjust the reception patterns 204 of those microphones 126 that received the matched audio stream, to suppress or even null audio reception of those microphones 126. For example, in 408, user interface and command module 128 may identify the microphones 126 where the signal amplitude (or signal strength) was the greatest during reception of the matched audio stream (such as the front microphone 126A in the example orientation of FIG. 2), and then operate with beam forming module 132 to suppress or null audio reception of those microphones 126 using well known beam forming techniques.

Alternatively or additionally, user interface and command module 128 in 408 may subtract the matched audio received in 406 from the combined audio received from all the microphones 126 in microphone array 124, to compensate for noise from the display device 104.

In some embodiments, the operations depicted in flowchart 402 are not performed when audio responsive electronic device 122 is powered by the battery 140 because receipt of the audio stream in 404 may consume significant power, particularly if receipt is via WIFI or cellular. Instead, in these embodiments, flowchart 402 is performed when audio responsive electronic device 122 is powered by an external source 142.

Referring back to FIG. 3, in 306, the position of a source of commands may be determined. For example, in some embodiments, user interface and command module 128 of the audio responsive electronic device 122 may determine the position of user 136, since user 136 may be considered to be the source of commands.

In some embodiments, audio responsive electronic device 122 may determine the position of user 136 using presence detector 160, since user 136 may be considered to be the source of commands. For example, presence detector 160 may detect user 136 being in a specific quadrant of a room.

In some embodiments, user 136 may enter configuration settings specifying the user 136 is the source of commands, and is positioned proximate to one of the microphones 126 (such as the back microphone 126C in the example orientation of FIG. 2). Accordingly, in 306, user interface and command module 128 may access the configuration settings in data storage 134 to determine the position of user 136.

In 308, audio from the source of commands may be enhanced. For example, user interface and command module 128 may enhance the audio sensitivity of microphones 126 proximate to the user 136 and having reception patterns 204 most likely to receive audio from user 136, using beam forming techniques. With regard to the example of FIG. 2, the user interface and command module 128 may use well known beam forming techniques to adjust the reception pattern 204C of back microphone 126C to enhance the ability of back microphone 126C to clearly receive audio from user 136.

Figure 5:
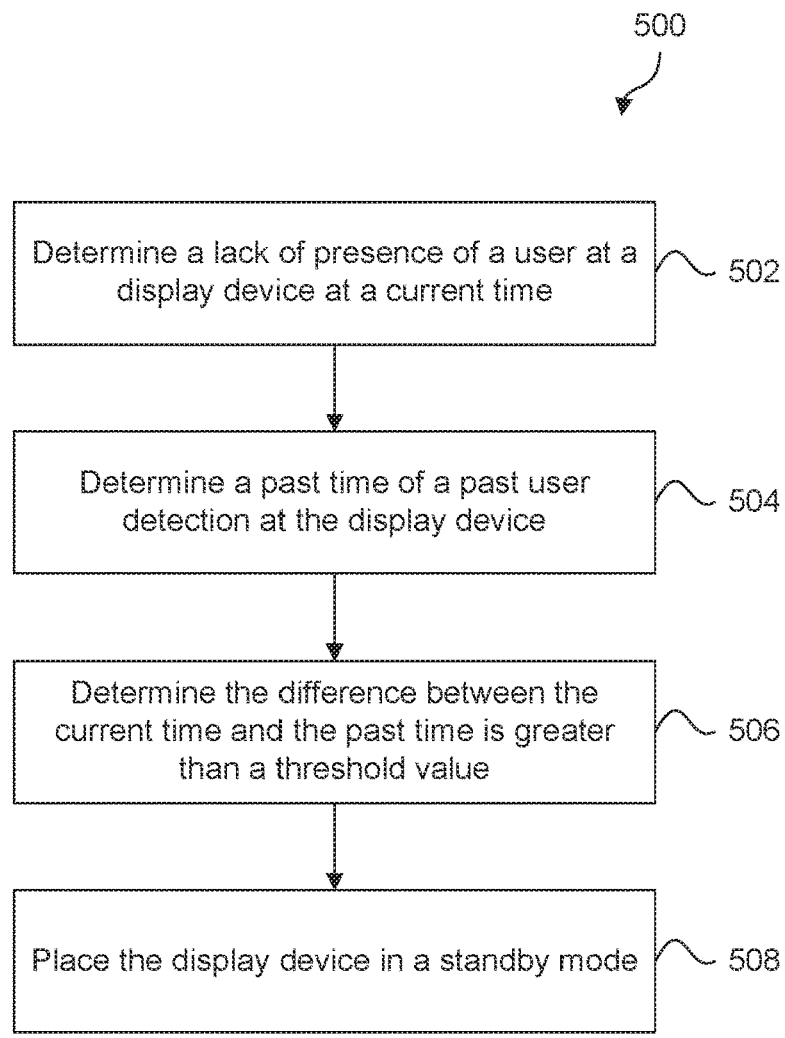
FIG. 5 illustrates a method for intelligently placing a display device in a standby mode, according to some embodiments.

FIG. 5 illustrates a method 500 for intelligently placing a display device in a standby mode, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

For illustrative and non-limiting purposes, method 500 shall be described with reference to FIG. 1. However, method 500 is not limited to that example.

In 502, display device 104 determines a lack of presence of user 136 at or proximate to display device 104 at a current time. For example, presence detector 150 of display device 104 may determine a lack of presence of user 136.

In 504, display device 104 determines a difference between the current time of 502 and a past time when a user was present. In some embodiments, presence detector 150 of display device 104 may have determined the past time when a user was present. In some other embodiments, display device 104 may have determined the past time when a user was present based on user interaction with display device 104.

In 506, display device 104 determines whether the difference of 504 is greater than a threshold value. In some embodiments, the threshold value may be user configured. In some other embodiments, the threshold value may be defined by display device 104.

In 508, display device 104 places itself in a standby mode in response to the determination that the difference of 506 is greater than the threshold value in 506. For example, display device 104 may turn off one or more of display 106, speaker(s) 108, control module 110, and transceiver 112. In some embodiments, display device 104 may prompt user 136 via display 106 and or speaker(s) 108 to confirm user 136 is still watching and or listening to display device 104. Display device 104 may place itself in standby mode if user 136 does not respond to the prompt within a period of time.

Figure 6:
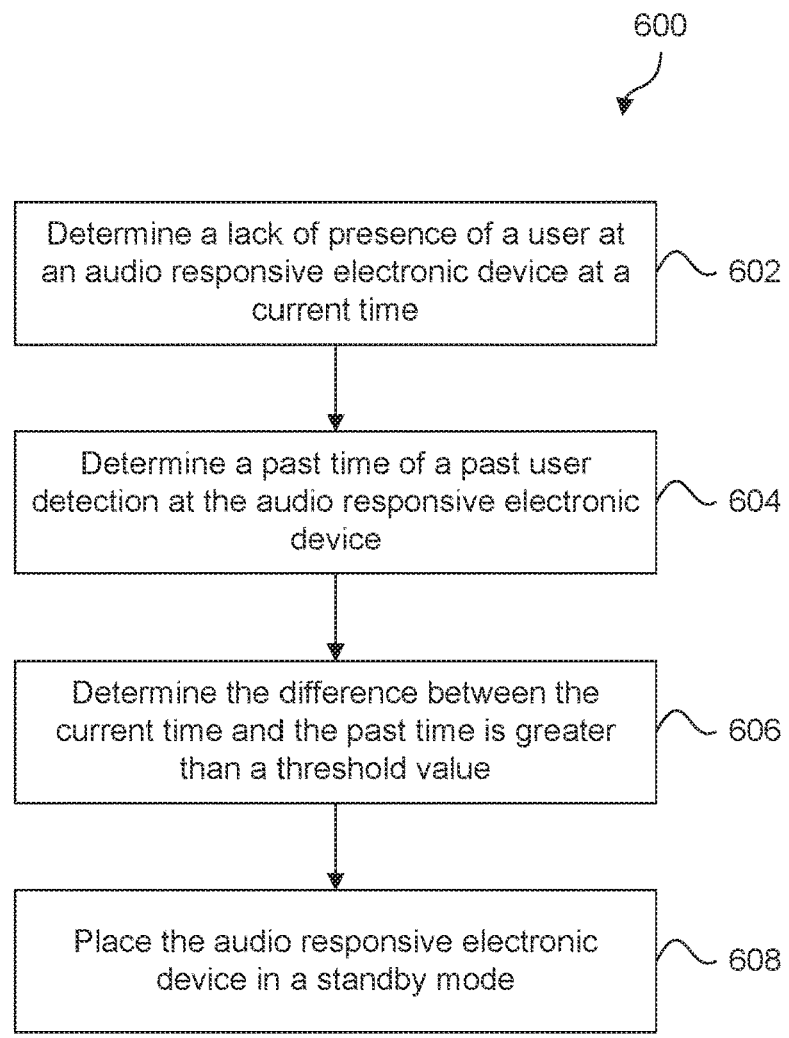
FIG. 6 illustrates a method for intelligently placing an audio remote control in a standby mode, according to some embodiments.

FIG. 6 illustrates a method 600 for intelligently placing an audio remote control in a standby mode, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

For illustrative and non-limiting purposes, method 600 shall be described with reference to FIGS. 1 and 2. However, method 600 is not limited to these examples.

In 602, audio responsive electronic device 122 determines a lack of presence of user 136 at audio responsive electronic device 122 at a current time. For example, presence detector 160 of audio responsive electronic device 122 may determine a lack of presence of user 136.

In 604, audio responsive electronic device 122 determines a difference between the current time of 602 and a past time when a user was present. In some embodiments, presence detector 160 of audio responsive electronic device 122 may have determined the past time when a user was present. In some other embodiments, audio responsive electronic device 122 may have determined the past time when a user was present based on user interaction with audio responsive electronic device 122.

In 606, audio responsive electronic device 122 determines whether the difference of 604 is greater than a threshold value. In some embodiments, the threshold value may be user configured. In some other embodiments, the threshold value may be defined by audio responsive electronic device 122.

In 608, audio responsive electronic device 122 places itself in a standby mode in response to the determination that the difference of 606 is greater than the threshold value in 606. For example, audio responsive electronic device 122 may turn off one or more of microphone array 124, user interface and command module 128, transceiver 130, beam forming module 132, data storage 134, visual indicators 182, speakers 190, and processing module 184. In some embodiments, audio responsive electronic device 122 may prompt user 136 via visual indicators 182 and or speakers 190 to confirm user 136 is still intends to interact with audio responsive electronic device 122. Audio responsive electronic device 122 may place itself in standby mode if user 136 does not respond to the prompt within a period of time.

Figure 7:
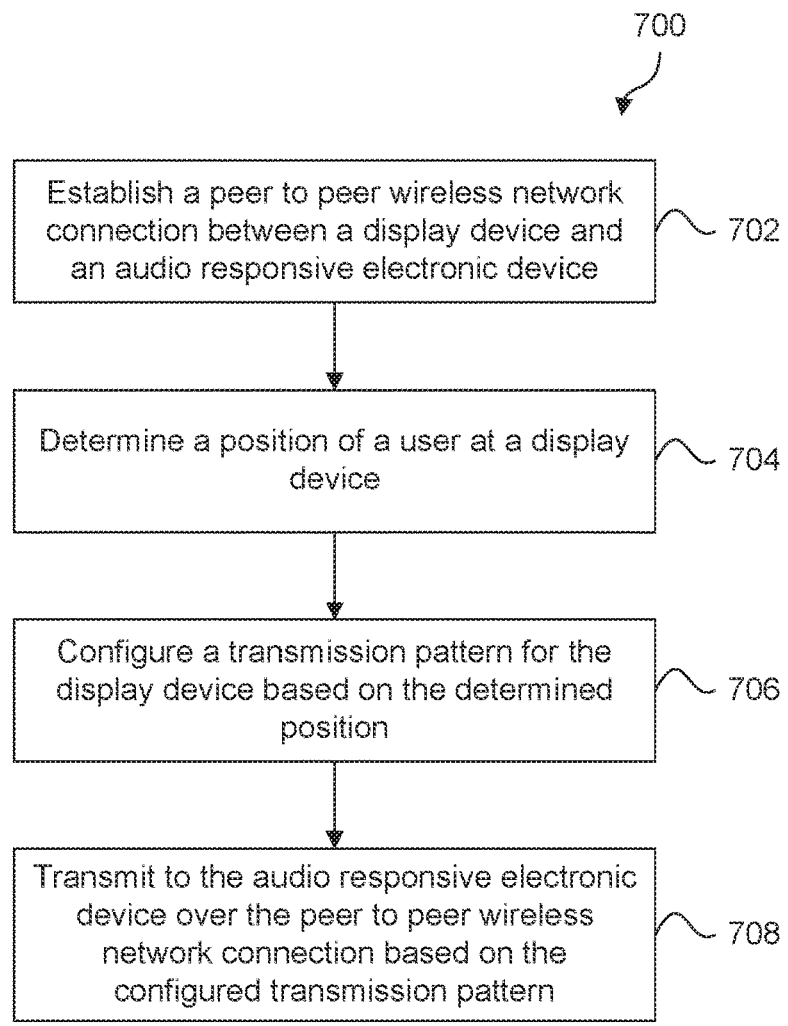
FIG. 7 illustrates a method for performing intelligent transmission from a display device to an audio remote control, according to some embodiments.

FIG. 7 illustrates a method 700 for performing intelligent transmission from a display device to an audio remote control, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

For illustrative and non-limiting purposes, method 500 shall be described with reference to FIG. 1. However, method 700 is not limited to that example.

In 702, display device 104 establishes a peer to peer wireless network connection to audio responsive electronic device 122. For example, display device 104 establishes a WiFi Direct connection to audio responsive electronic device 122. Display device 104 may transmit large amounts of data over this peer to peer wireless network connection. For example, display device 104 may stream music over this peer to peer wireless network connection. Audio responsive electronic device 122 may play the streaming music via speakers 190. Alternatively, audio responsive electronic device 122 may be communicatively coupled to a set of headphones and play the streaming music via the headphones.

In 704, display device 104 determines a position of user 136 at or proximate to display device 104. For example, presence detector 150 of display device 104 may determine a position of user 136. Display device 104 determines a position of user 136 because user 136 will likely be at the same position as audio responsive electronic device 122.

In 706, display device 104 configures a transmission pattern for the peer to peer wireless network connection based on the determined position of user 136 in 704. For example, beam forming module 170 of display device 104 may use beam forming techniques discussed herein to configure transceiver 112 to emphasize or enhance a transmission signal for the peer to peer wireless networking connection toward the determined position of user 136 in 704, e.g., the position of audio responsive electronic device 122.

In 708, display device 104 performs a transmission to audio responsive electronic device 122 over the peer to peer wireless network according to the configured transmission pattern of 706.

For example, user 136 may listen to streaming music over the peer to peer wireless network connection via a pair of headphones communicatively coupled to audio responsive electronic device 122. But streaming music involves transmitting large amounts of data at a steady rate. As a result, streaming music over a low bandwidth and or intermittent connection may result in choppy playback of the streaming music and or a loss of audio quality. Accordingly, enhancement of a transmission signal for the peer to peer wireless networking connection may increase the bandwidth of the connection and decrease connection interruptions. This may reduce choppy playback of the streaming music and or poor audio quality.

For example, display device 104 may determine the position of user 136 in a room as discussed herein. For example, display device 104 may determine that user 136 is sitting on a sofa in a specific quadrant in the room. Based on this positional information, display device 104 may use beam forming techniques discussed herein to configure transceiver 112 to enhance a transmission signal for the peer to peer wireless networking connection toward the determined position of user 136, e.g., the position of audio responsive electronic device 122. This may increase the bandwidth of the peer to peer wireless connection and decrease connection interruptions. This may further reduce choppy playback and or poor audio quality during playback of the streaming music on audio responsive electronic device 122, e.g., via a set of headphones communicatively coupled to audio responsive electronic device 122.

As would be appreciated by a person of ordinary skill in the art, display device 104 may enhance a transmission signal for the peer to peer wireless networking connection to improve the performance of various other functions of audio responsive electronic device 122 such as, but not limited to, video playback and the playing of video games. Moreover, as would be appreciated by a person of ordinary skill in the art, other devices in system 102 may be configured to enhance a transmission signal for a wireless network connection based on the detected presence or position of user 136 using presence detector 150 or presence detector 160.

Figure 8:
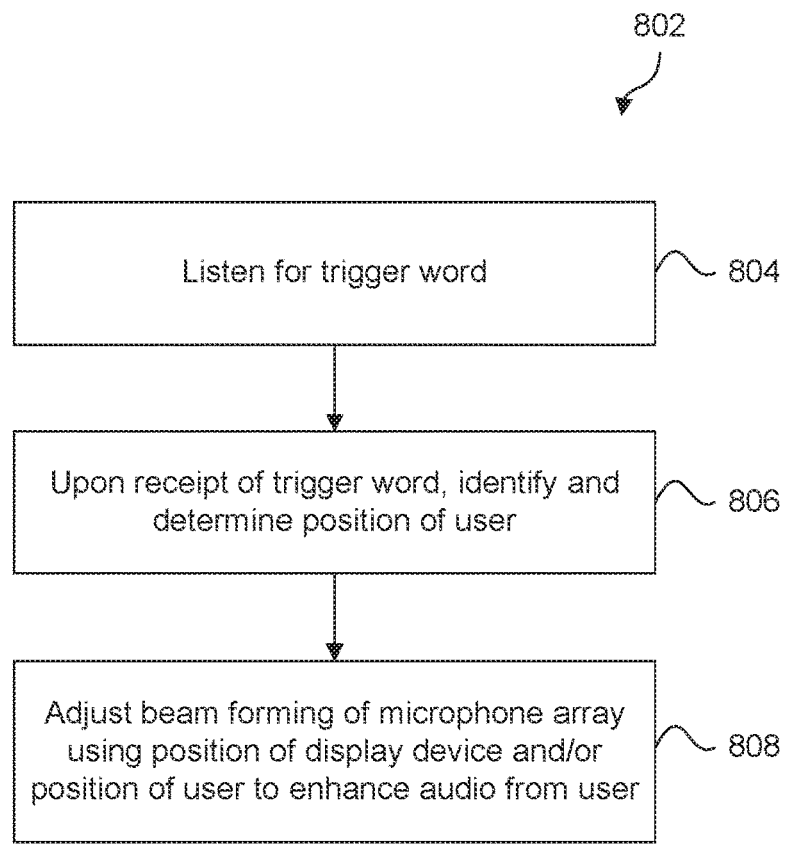
FIG. 8 illustrates a method for enhancing audio from a user, according to some embodiments.

FIG. 8 illustrates a method 802 for enhancing audio from a user, according to some embodiments. In some embodiments, method 802 is an alternative implementation of elements 306 and/or 308 in FIG. 3.

In 804, the user interface and command module 128 in the audio responsive electronic device 122 receives audio via microphone array 124, and uses well know speech recognition technology to listen for any predefined trigger word.

In 806, upon receipt of a trigger word, user interface and command module 128 determines the position of the user 136. For example, in 806, user interface and command module 128 may identify the microphones 126 where the signal amplitude (or signal strength) was the greatest during reception of the trigger word(s) (such as the back microphone 126C in the example of FIG. 2), and then operate with beam forming module 132 to adjust the reception patterns 126 of the identified microphones 126 (such as reception pattern 126C of the back microphone 126C) to enhance audio sensitivity and reception by those microphones 126. In this way, user interface and command module 128 may be able to better receive audio from user 136, to thus be able to better recognize commands in the received audio. Beam forming module 132 may perform this functionality using any well known beam forming technique, operation, process, module, apparatus, technology, etc.

In embodiments, trigger words and commands may be issued by any audio source. For example, trigger words and commands may be part of the audio track of content such that the speakers 108 of display device 104 may audibly output trigger words and audio commands as the content (received from media device 114) is played on the display device 104. In an embodiment, such audio commands may cause the media device 114 to retrieve related content from content sources 120, for playback or otherwise presentation via display device 104. In these embodiments, audio responsive electronic device 122 may detect and recognize such trigger words and audio commands in the manner described above with respect to FIGS. 3, 4, and 8, except in this case the display device 104 is the source of the commands, and the user 136 is a source of noise. Accordingly, with respect to FIG. 3, elements 302 and 304 are performed with respect to the user 136 (since in this example the user 136 is the source of noise), and elements 306 and 308 are performed with respect to the display device 104 (since in this example the display device 104 is the source of audio commands).

In some embodiments, different trigger words may be used to identify the source of commands. For example, the trigger word may be "Command" if the source of commands is the user 136. The trigger word may be "System" if the source of the commands is the display device 104 (or alternatively the trigger word may be a sound or sequence of sounds not audible to humans if the source of the commands is the display device 104). In this manner, the audio responsive electronic device 122 is able to determine which audio source to de-enhance, and which audio source to enhance. For example, if the audio responsive electronic device 122 determines the detected trigger word corresponds to the display device 104 (such that the display device 104 is the source of audio commands), then the audio responsive electronic device 122 may operate in 302 and 304 of FIG. 3 to de-enhance audio from user 136, and operate in 306 and 308 of FIG. 3 to enhance audio from the display device 104.

In embodiments, the beam forming algorithms executed by the beam forming module 132 can be simplified because the display device 104 and the user 136 are typically at stable locations relative to the audio responsive electronic device 122. That is, once initially positioned, the display device 104 and the audio responsive electronic device 122 are typically not moved, or are moved by small amounts. Also, users 136 tend to watch the display device 104 from the same locations, so their locations relative to the audio responsive electronic device 122 are also often stable.

Providing Visual Indicators from Computing Entities/Devices that are Non-Native to an Audio Responsive Electronic Device As noted above, in some embodiments, the audio responsive electronic device 122 may communicate and operate with one or more digital assistants 180 via the network 118. A digital assistant may include a hardware front-end component and a software back-end component. The hardware component may be local to the user (located in the same room, for example), and the software component may be in the Internet cloud. Often, in operation, the hardware component receives an audible command from the user, and provides the command to the software component over a network, such as the Internet. The software component processes the command and provides a response to the hardware component, for delivery to the user (for example, the hardware component may audibly play the response to the user). In some embodiments, the digital assistants 180 shown in FIG. 1 represent the software back-end; examples include but are not limited to AMAZON ALEXA, SIRI, CORTANA, GOOGLE ASSISTANT, etc. In some embodiments, the audio responsive electronic device 122 represents the hardware front-end component. Thus, in some embodiments, the audio responsive electronic device 122 takes the place of AMAZON ECHO when operating with ALEXA, or the IPHONE when operating with SIRI, or GOOGLE HOME when operating with the GOOGLE ASSISTANT, etc.

As discussed above, AMAZON ECHO is native to ALEXA. That is, AMAZON ECHO was designed and implemented specifically for ALEXA, with knowledge of its internal structure and operation, and vice versa. Similarly, the IPHONE is native to SIRI, MICROSOFT computers are native to CORTANA, and GOOGLE HOME is native to GOOGLE ASSISTANT. Because they are native to each other, the back-end software component is able to control and cause the front-end hardware component to operate in a consistent, predictable and precise manner, because the back-end software component was implemented and operates with knowledge of the design and implementation of the front-end hardware component.

In contrast, in some embodiments, the audio responsive electronic device 122 is not native to one or more of the digital assistants 180. There is a technological challenge when hardware (such as the audio responsive electronic device 122) is being controlled by non-native software (such as digital assistants 180). The challenge results from the hardware being partially or completely a closed system from the point of view of the software. Because specifics of the hardware are not known, it is difficult or even impossible for the non-native software to control the hardware in predictable and precise ways.

Consider, for example, visual indicators 182 in the audio responsive electronic device 122. In some embodiments, visual indicators 182 are a series of light emitting diodes (LEDs), such as 5 diodes (although the visual indicators 182 can include more or less than 5 diodes). Digital assistants 180 may wish to use visual indicators 182 to provide visual feedback to (and otherwise visually communicate with) the user 136. However, because they are non-native, digital assistants 180 may not have sufficient knowledge of the technical implementation of the audio responsive electronic device 122 to enable control of the visual indicators 182 in a predictable and precise manner.

Figure 9:
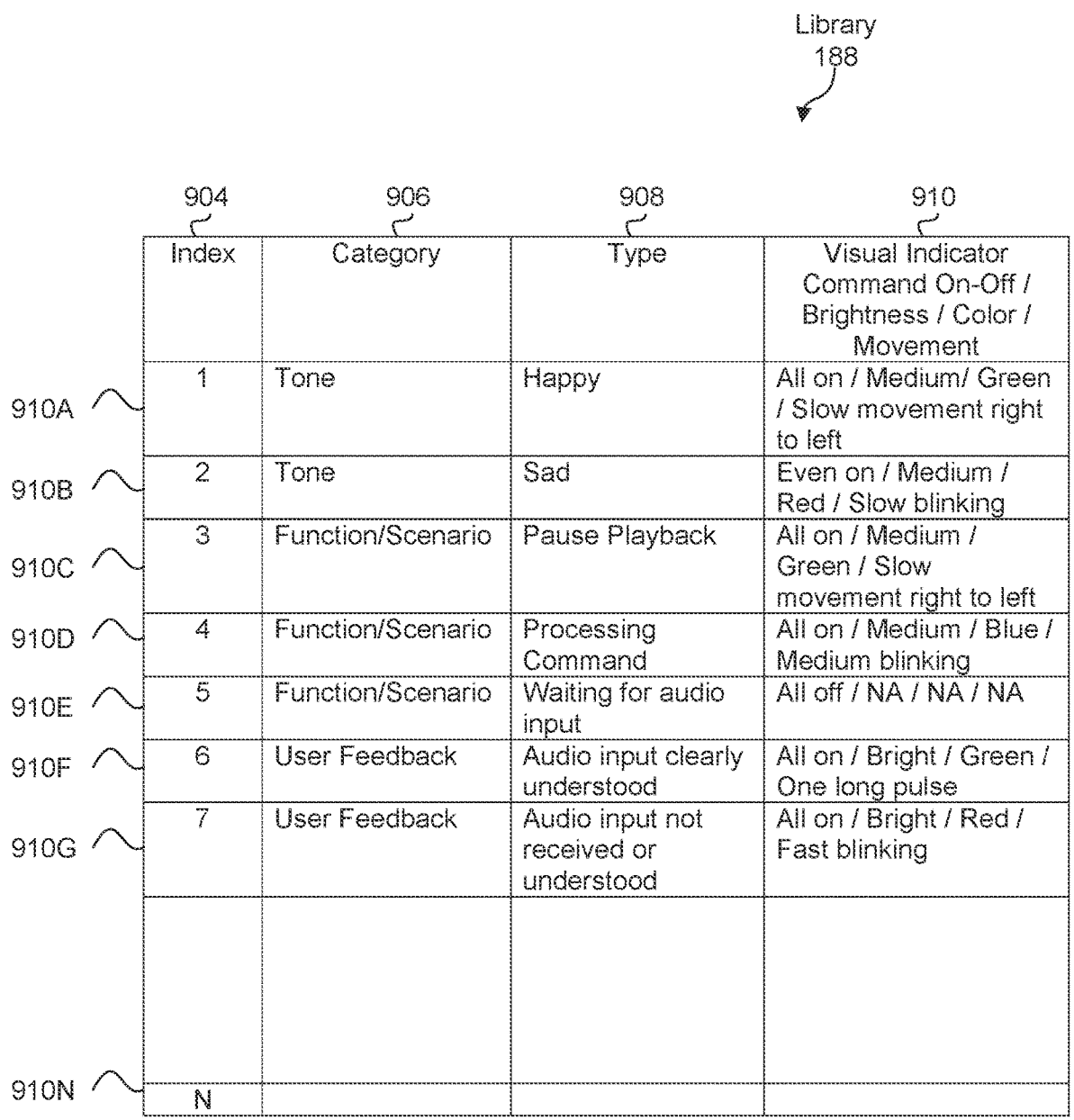
FIG. 9 illustrates an example application programming interface (API) that includes a library of example commands for controlling visual indicators of an audio responsive electronic device, according to some embodiments.

Some embodiments of this disclosure solve this technological challenge by providing a processor or processing module 184, and an interface 186 and a library 188. An example library 188 is shown in FIG. 9. In some embodiments, the library 188 and/or interface 186 represent an application programming interface (API) having commands for controlling the visual indicators 182. Native and non-native electronic devices, such as digital assistants 180, media device 114, content sources 120, display device 104, etc., may use the API of the library 188 to control the audio responsive electronic device 122 in a consistent, predictable and precise manner.

In some embodiments, the library 188 may have a row 910 for each command supported by the API. Each row 910 may include information specifying an index 904, category 906, type (or sub-category) 908, and/or visual indicator command 910. The index 904 may be an identifier of the API command associated with the respective row 910. The category 906 may specify the category of the API command. In some embodiments, there may be three categories of API commands: tone, function/scenario and user feedback. However, other embodiments may include more, less and/or different categories.

The tone category may correspond to an emotional state that a digital assistant 180 may wish to convey when sending a message to the user 136 via the audio responsive electronic device 122. The example library 188 of FIG. 9 illustrates 2 rows 910A, 910B of the tone category. The emotional state may be designated in the type field 908. According, row 910A corresponds to a "happy" emotional state, and row 910B corresponds to a "sad" emotional state. Other embodiments may include any number of tone rows corresponding to any emotions.

The function/scenario category may correspond to functions and/or scenarios wherein a digital assistant 180 may wish to convey visual feedback to the user 136 via the audio responsive electronic device 122. The example library 188 of FIG. 9 illustrates 3 rows 910C, 910D, 910E of the function/scenario category. The function/scenario may be designated in the type field 908. According, row 910C corresponds to a situation where the audio responsive electronic device 122 is pausing playback, row 910D corresponds to a situation where the audio responsive electronic device 122 is processing a command, and row 910E corresponds to a situation where the audio responsive electronic device 122 is waiting for audio input. Other embodiments may include any number of function/scenario rows corresponding to any functions and/or scenarios.

The user feedback category may correspond to situations where a digital assistant 180 or the audio responsive electronic device 122 may wish to provide feedback or information (or otherwise communicate with) the user 136. The example library 188 of FIG. 9 illustrates 2 rows 910F, 910G of the user feedback category. The user feedback situation may be designated in the type field 908. According, row 910F corresponds to a situation where a digital assistant 180 or the audio responsive electronic device 122 wishes to inform the user 136 that audio input was clearly understood. Row 910G corresponds to a situation where a digital assistant 180 or the audio responsive electronic device 122 wishes to inform the user 136 that audio input was not received or understood. Other embodiments may include any number of user feedback rows corresponding to any user feedback messages.

The library 188 may specify how the audio responsive electronic device 122 operates for the commands respectively associated with the rows 910. For example, information in the visual indicator command 910 field may specify how the visual indicators 182 in the audio responsive electronic device 122 operate for the commands respectively associated with the rows 910. While the following describes operation of the visual indicators 182, in other embodiments the library 188 may specify how other functions and/or features of the audio responsive electronic device 122 operate for the commands respectively associated with the rows 910.

In some embodiments, the visual indicator field 910 indicates: which LEDs of the visual indicators 182 are on or off; the brightness of the "on" LEDs; the color of the "on" LEDs; and/or the movement of light of the LEDs (for example, whether the "on" LEDs are blinking, flashing from one side to the other, etc.). For example, for row 910A, corresponding to the "happy" tone, all the LEDs are on with medium brightness, the color is green, and the LEDs are turned on to simulate slow movement from right to left. For row 910D, corresponding to the "processing command" function/scenario, all the LEDs are on with medium brightness, the color is blue, and the LEDs are blinking at medium speed. For row 910E, corresponding to the "waiting for audio input" function/scenario, all the LEDs are off. For row 910G, corresponding to the "audio input not received or understood" user feedback category, all the LEDs are on with high brightness, the color is red, and the LEDs are blinking at high speed. These settings in the visual indicator command field 910 are provided for illustrative purposes only and are not limiting. These settings in the visual indicator command field 910 can be any user-defined settings.

Figure 10:
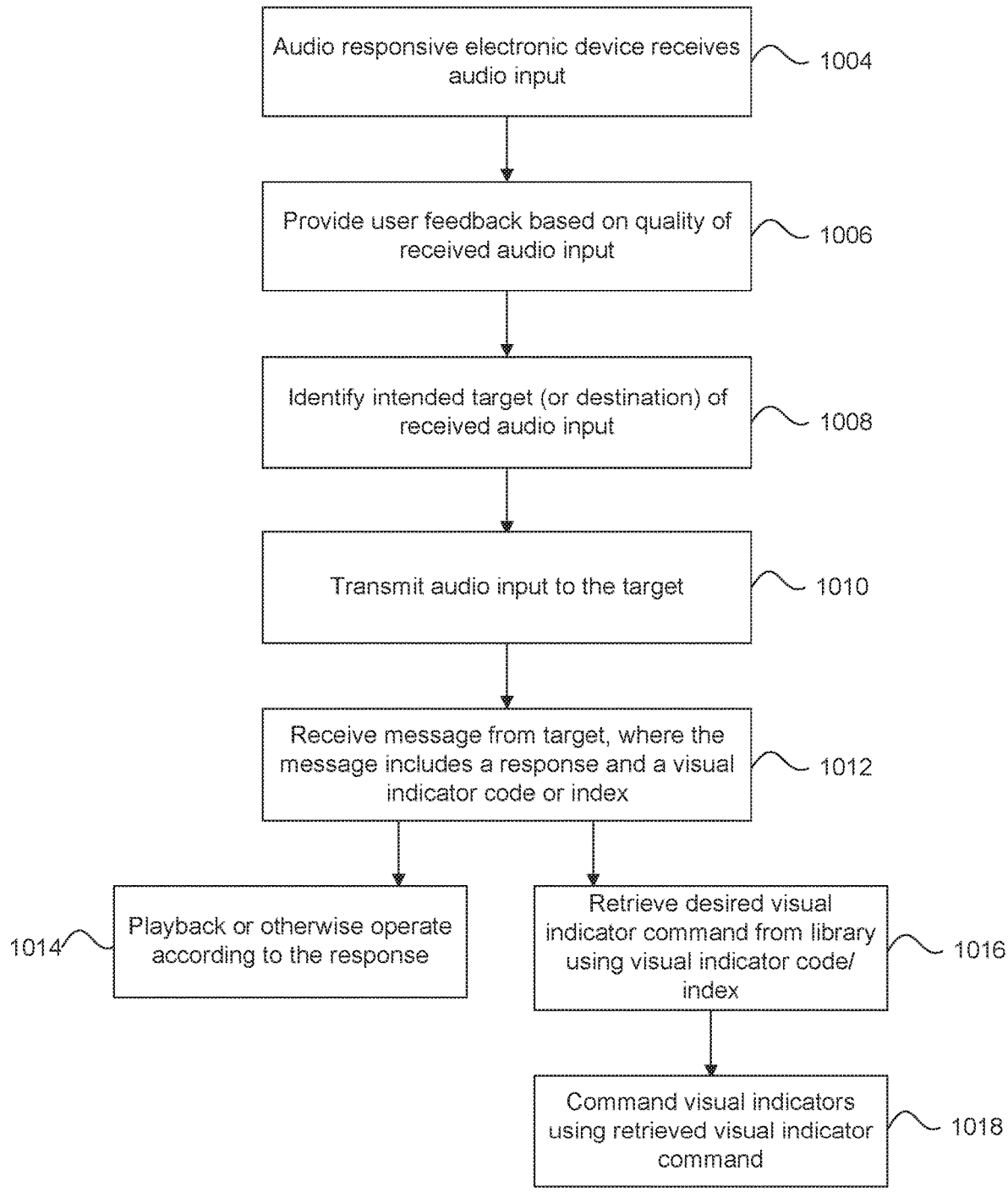
FIG. 10 illustrates a method in an audio responsive electronic device for providing to users visual indicators from computing entities/devices that are non-native to the audio responsive electronic device, according to some embodiments.

FIG. 10 illustrates a method 1002 in the audio responsive electronic device 122 for predictably and precisely providing users 136 with visual information from computing entities/devices, such as but not limited to digital assistants 180, media device 114, content sources 120, display device 104, etc. Such computing entities/devices may be native or non-native to the audio responsive electronic device 122. Accordingly, embodiments of this disclosure overcome the technical challenge of enabling a first computing device to predictably and precisely interact with and control a second computing device, when the first computer device is not native to the second computing device.

Method 1002 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

For illustrative and non-limiting purposes, method 1002 shall be described with reference to FIGS. 1 and 9. However, method 1002 is not limited to those examples.

In 1004, the audio responsive electronic device 122 receives audio input from user 136 or another source, such as from speakers 108 of display 104. The microphone array 124 of the audio responsive electronic device 122 receives such audio input. For example, user 136 may say "When does the new season of GAME OF THRONES start?"

In 1006, the audio responsive electronic device 122 determines if the audio input was properly received and understood. The audio input may not have been properly received if the user 136 was speaking in a low voice, if there was noise from other sources (such as from other users or the display device 104), or any number of other reasons. The audio responsive electronic device 122 may use well known speech recognition technology to assist in determining whether the audio input was properly received and understood in step 1006.

In some embodiments, in step 1006, the audio responsive electronic device 122 may use the library 188 to provide visual feedback to the user 136 as to whether the audio input was properly received and understood. For example, the audio responsive electronic device 122 may send index 6 to the interface 186 of processor 184 when the audio input was properly received and understood. Processor 184 may access the library 188 using Index 6 to retrieve the information from row 910F, which corresponds to the "audio input clearly understood" user feedback command. The processor 184 may use the visual indicator command field 910 of the retrieved row 910F to cause the LEDs of the visual indicators 182 to be one long bright green pulse.

As another example, the audio responsive electronic device 122 may send Index 7 to the interface 186 of processor 184 when the audio input was not properly received and understood. Processor 184 may access the library 188 using Index 7 to retrieve the information from row 910G, which corresponds to the "audio input not received or understood" user feedback command. The processor 184 may use the visual indicator command field 910 of the retrieved row 910G to cause the LEDs of the visual indicators 182 to be all on, bright red, and fast blinking.

If, in 1006, the audio responsive electronic device 122 determined the audio input was properly received and understood, then in 1008 the audio responsive electronic device 122 analyzes the audio input to identify the intended target (or destination) of the audio input. For example, the audio responsive electronic device 122 may analyze the audio input to identify keywords or trigger words in the audio input, such as "HEY SIRI" (indicating the intended target is SIRI), "HEY GOOGLE" (indicating the intended target is the GOOGLE ASSISTANT), or "HEY ROKU" (indicating the intended target is the media device 114).

In 1010, the audio responsive electronic device 122 transmits the audio input to the intended target identified in 1008, via the network 118. The intended target processes the audio input and sends a reply message to the audio responsive electronic device 122 over the network. In some embodiments, the reply message may include (1) a response, and (2) a visual indicator index.

For example, assume the intended target is SIRI and the audio input from step 1004 is "When does the new season of GAME OF THRONES start?" If SIRI is not able to find an answer to the query, then the reply message from SIRI may be:

(1) Response: "I don't know"
(2) Visual Indicator Index: 2

If SIRI is able to find an answer to the query, then the reply message from SIRI may be:

(1) Response: "Soon"
(2) Visual Indicator Index: 1

In 1014, the audio responsive electronic device 122 processes the response received in step 1012. The response may be a message to audibly playback to the user 136 via speakers 190, or may be commands the audio responsive electronic device 122 is instructed to perform (such as commands to control the media device 114, the display device 104, etc.). In the above examples, the audio responsive electronic device 122 may play over speakers 190 "I don't know" or "Soon."

Steps 1016 and 1018 are performed at the same time as step 1014, in some embodiments. In 1016, the interface 186 of the audio responsive electronic device 122 uses the visual indicator index (received in 1012) to access and retrieved information from a row 910 in the library 188. The processor 184 or interface 186 uses information in the visual indicator command field 910 of the retrieved row 910 to configure the visual indicators 182.

In the above examples, when the received response is "I don't know" and the received visual indicator index is 2, the processor 184 or interface 186 causes every other LED of the visual indicators 182 to be on, red with medium intensity, slowly blinking. When the received response is "Soon" and the received visual indicator index is 1, the processor 184 or interface 186 causes all the LEDs of the visual indicators 182 to be on, green with medium intensity, configured to simulate slow movement from right to left.

The above operation of the audio responsive electronic device 122, and the control and operation of the visual indicators 182, referenced SIRI as the intended digital assistant 180 for illustrative purposes only. It should be understood, however, that the audio responsive electronic device 122 and the visual indicators 182 would operate in the same predictable and precise way for any other digital assistant 180, display device 104, media device 114, etc., whether native or non-native to the audio responsive electronic device 122.

Play/Stop and "Tell Me Something" Buttons in an Audio Responsive Electronic Device Some audio responsive electronic devices are configured to respond solely to audible commands. For example, consider a scenario where a user says a trigger word followed by "play country music." In response, the audio responsive electronic device associated with the trigger word may play country music. To stop playback, the user may say the trigger word followed by "stop playing music." A problem with this example scenario exists, however, because the music being played may make it difficult for the audio responsive electronic device to properly receive and respond to the user's "stop playing music" command. Accordingly, the user may be required to repeat the command, or state the command in a louder voice, either of which may detract from the user's enjoyment of the audio responsive electronic device.

Figure 14:
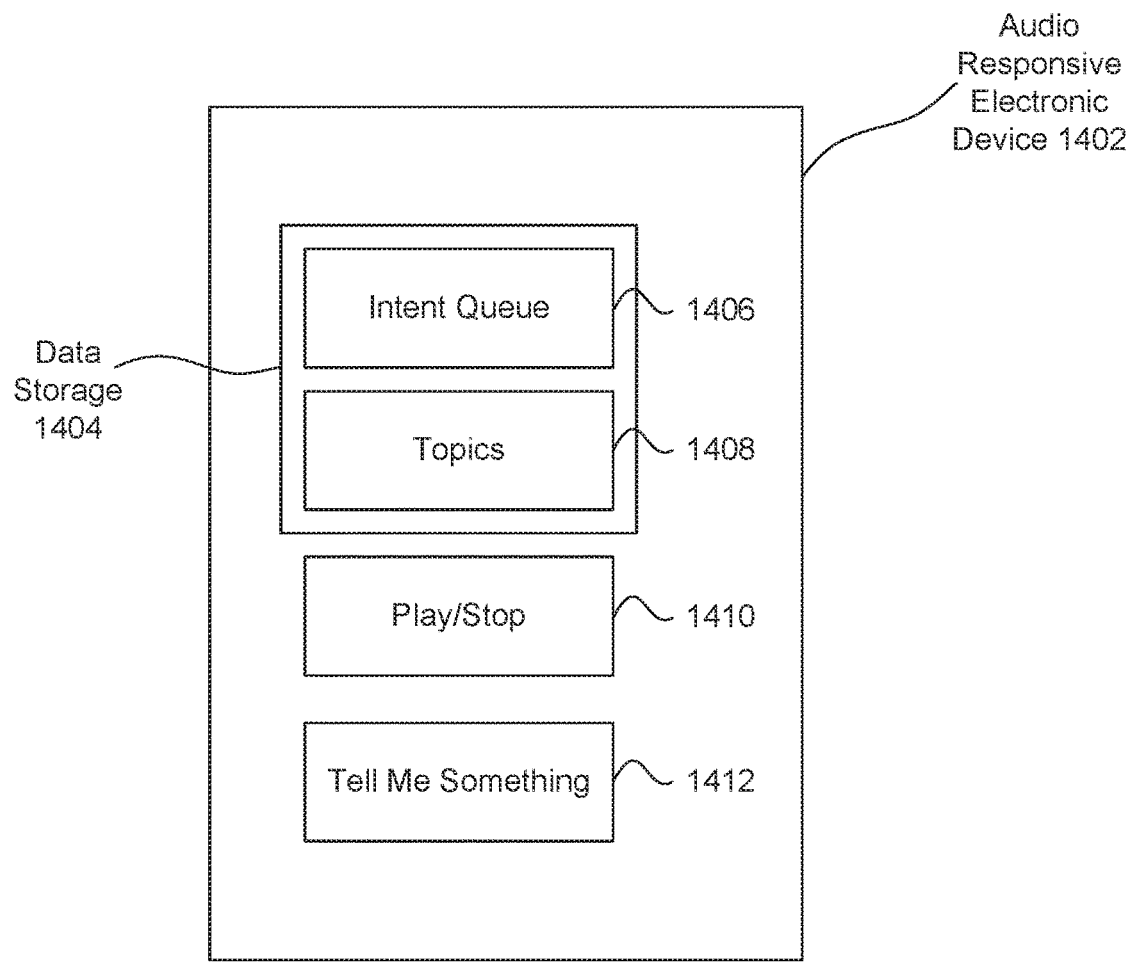
FIG. 14 illustrates an audio responsive electronic device having a play/stop button and a tell me something button, according to some embodiments.

FIG. 14 illustrates an audio responsive electronic device 1402 having a play/stop button 1410, according to some embodiments. The play/stop button 1410 addresses these and other issues. It is noted that play/stop button 1410 may have different names in different embodiments.

The audio responsive electronic device 1402 also includes data storage 1404 and a "tell me something" button 1412. Data storage 1404 includes an intent queue 1406 and topics database 1408. For ease of readability, only some of the components of audio responsive electronic device 1402 are shown in FIG. 14. In addition to, or instead of, those shown in FIG. 14, audio responsive electronic device 1402 may include any combination of components and/or function(s) of the audio responsive electronic device embodiments discussed herein.

Figure 15:
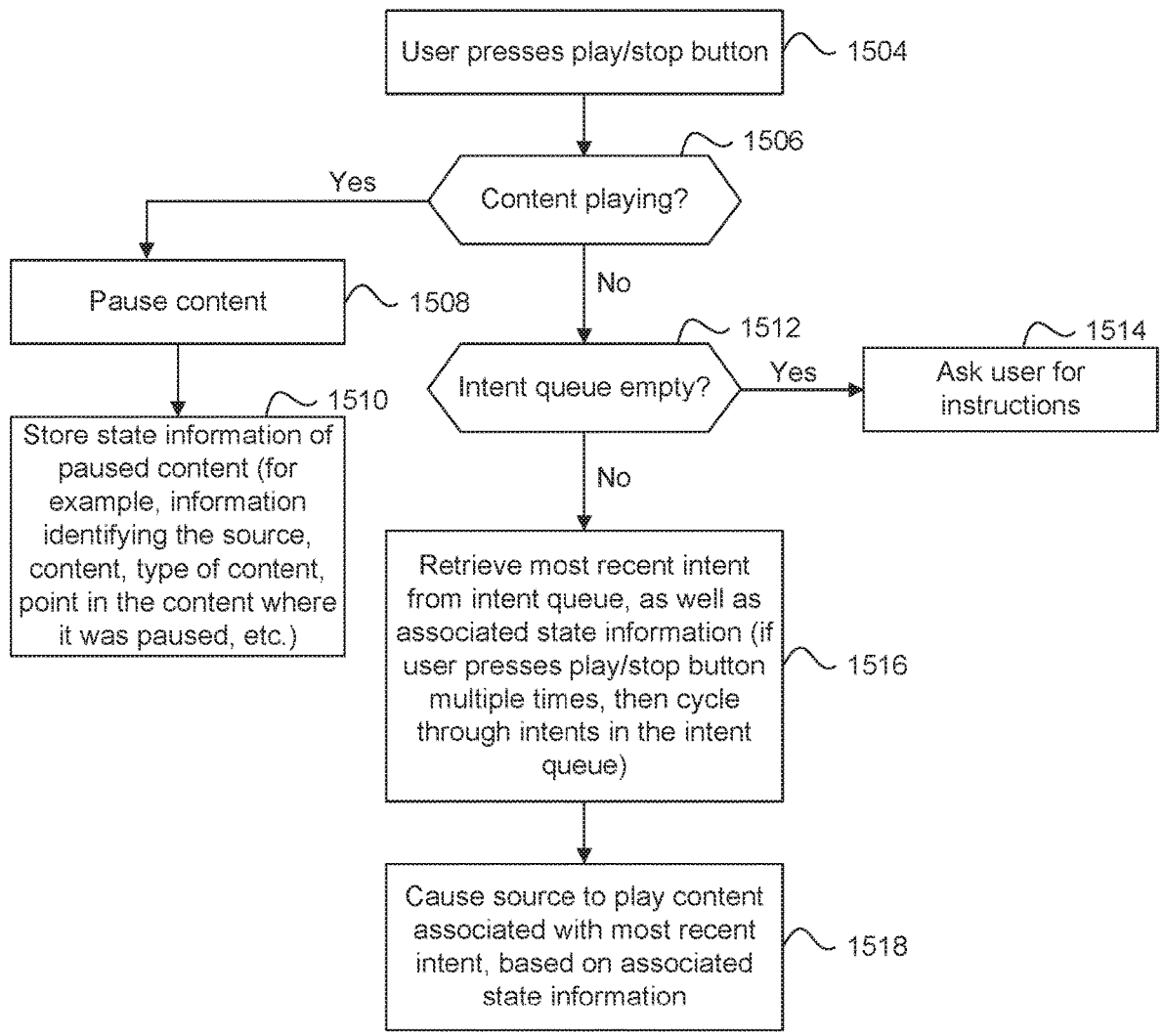
FIGS. 15 and 16 illustrate flowcharts for controlling an audio responsive electronic device using a play/stop button, according to some embodiments.

FIG. 15 illustrates a method 1502 for controlling an audio responsive electronic device using a play/stop button, according to some embodiments. Method 1502 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 15, as will be understood by a person of ordinary skill in the art.

For illustrative and non-limiting purposes, method 1502 shall be described with reference to FIGS. 1 and 14. However, method 1502 is not limited to those examples.

In 1504, a user 136 may press the play/stop button 1410 of the audio responsive electronic device 1402. Alternatively, the user 136 may say a trigger word associated with the audio responsive electronic device 1402 followed by "stop" or "pause" (or a similar command).

In 1506, the audio responsive electronic device 1402 may determine if it is currently playing content, and/or if another device in media system 102 is currently playing content (such as media device 114 and/or display device 104). For example, in 1506, the audio responsive electronic device 1402 may determine that it is currently playing music. Alternatively, in 1506, the audio responsive electronic device 1402 may determine that media device 114 in combination with display device 104 is currently playing a movie or TV program.

If audio responsive electronic device 1402 determines in 1506 that content is currently playing, then 1508 is performed. In 1508, the audio responsive electronic device 1402 may pause the playback of the content, or may transmit appropriate commands to other devices in media system 102 (such as media device 114 and/or display device 104) to pause the playback of the content.

In 1510, the audio responsive electronic device 1402 may store state information regarding the paused content. Such state information may include, for example, information identifying the content, the source of the content (that is, which content source 120 provided, or was providing, the content), type of content (music, movie, TV program, audio book, game, etc.), genre of content (genre of music or movie, for example), the timestamp of when the pause occurred, and/or point in the content where it was paused, as well as any other state information that may be used to resume playing content (based on the paused content) at a later time.

In some embodiments, the intent queue 1406 in data storage 1404 stores the last N intents corresponding to the last N user commands, where N (an integer) is any predetermined system setting or user preference. The audio responsive electronic device 1402 stores such intents in the intent queue 1406 when it receives them from the voice platform 192 (for example, see step 1310, discussed above). In some embodiments, the intent queue 1406 is configured as a last-in first-out (LIFO) queue.

In some embodiments, in 1510, the audio responsive electronic device 1402 may store the state information in the intent queue 1406 with the intent corresponding to the content that was paused in 1508. In other words, the content that was paused in 1508 was originally caused to be played by the audio responsive electronic device 1402 based on an intent associated with an audible command from a user. The audio responsive electronic device 1402 in 1510 may store the state information with this intent in the intent queue 1406, such that if the intent is later accessed from the intent queue 1406, the state information may also be accessed.

Returning to 1506, if the audio responsive electronic device 1402 determines that content is not currently playing, then 1512 is performed. In 1512, the audio responsive electronic device 1402 may determine if the intent queue 1406 is empty. If the intent queue 1406 is empty, then in 1514 the audio responsive electronic device 1402 may prompt the user 136 to provide more information and/or command(s) on what the user 136 wished to perform when he pressed the play/stop button 1410 in step 1504.

If the intent queue 1406 is not empty, then 1516 is performed. In 1516, the audio responsive electronic device 1402 may retrieve the most recently added intent from the intent queue 1406. The audio responsive electronic device 1402 may also retrieve the state information stored with that intent. In some embodiments, if the user 136 in 1504 presses the play/stop button 1410 multiple times, then the audio responsive electronic device 1402 in 1516 may pop intents (and associated state information) from the intent queue 1406 in a LIFO manner.

In 1518, the audio responsive electronic device 1402 may resume playing content based on the retrieved content and associated state information. For example, in some embodiments, the audio responsive electronic device 1402 may (1) cause playback of the content to be resumed at the point where playback was paused at 1508; (2) cause playback of the content to be resumed at the beginning of the content; or (3) cause content in the same genre—but not the particular content associated with the retrieved intent—to be played. It is noted this disclosure is not limited to these example playback options.

Figure 16:
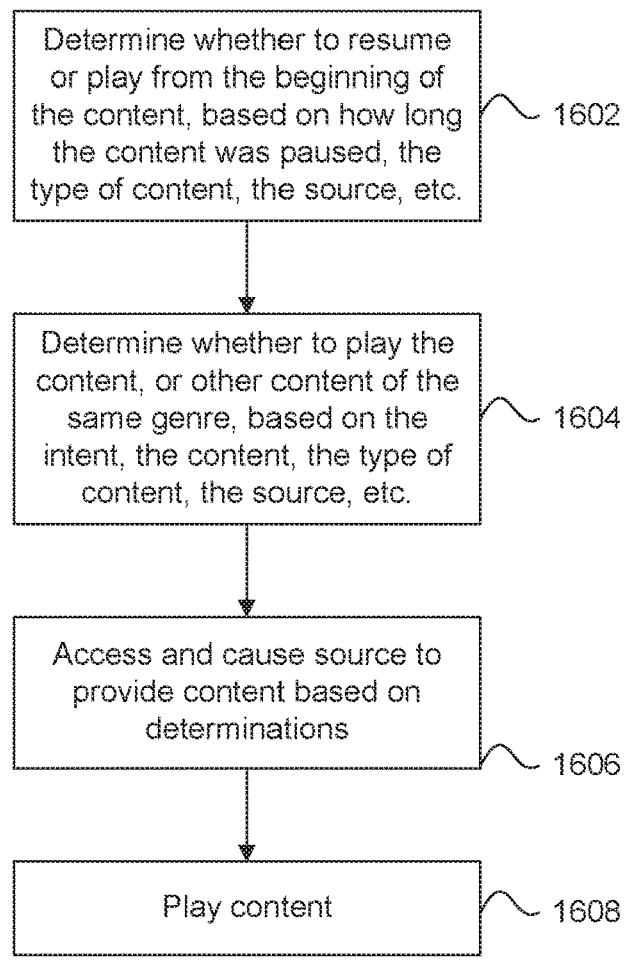

FIG. 16 illustrates a method 1600 for performing step 1518, according to some embodiments. In other words, method 1600 illustrates an example approach for determining how content will be played back in step 1518. Method 1600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 16, as will be understood by a person of ordinary skill in the art.

For illustrative and non-limiting purposes, method 1600 shall be described with reference to FIGS. 1 and 14. However, method 1600 is not limited to those examples.

In 1602, the audio responsive electronic device 1402 may determine whether to resume play of the content from the point where playback was paused, or from the beginning of the content, based on the retrieved state information, such as how long the content was paused, the type of content, the source, etc. For example, if play was paused for greater than a predetermined threshold (as determined using the timestamp in the state information identifying when the pause occurred), then the audio responsive electronic device 1402 may decide to resume playing the content from the beginning rather than the point where the pause occurred. As another example, if the type of the content is a movie or TV program, then the audio responsive electronic device 1402 may decide to resume playing the content from the point where the pause occurred. For other content types, such as music, the audio responsive electronic device 1402 may decide to resume playing the content from the beginning.

The audio responsive electronic device 1402 may also consider the source of the content in step 1602. For example, if the content source 120 allows retrieval of content only from the beginning, then the audio responsive electronic device 1402 may decide to resume playing the content from the beginning rather than the point where the pause occurred.

In 1604, the audio responsive electronic device 1402 may determine whether to play the content associated with the intent retrieved in step 1516, or other content of the same genre, based on the retrieved state information, such as the intent, the content, the type of content, the source, etc. For example, if the user's original command (as indicated by the intent) was to play a particular song, then the audio responsive electronic device 1402 may decide to play that specific song. If, instead, the user's original command was to play a genre of music (such as country music), then the audio responsive electronic device 1402 may decide to play music within that genre rather than the song paused at step 1508.

The audio responsive electronic device 1402 may also consider the source of the content in step 1604. For example, if the content source 120 does not allow random access retrieval of specific content, but instead only allows retrieval based on genre, then the audio responsive electronic device 1402 may decide to play content within the same genre of the content associated with the intent retrieved in step 1516.

In step 1606, the audio responsive electronic device 1402 may access the content source(s) 120 identified in the state information to retrieve content pursuant to the determinations made in steps 1602 and/or 1604.

In step 1608, the audio responsive electronic device 1402 may play the content retrieved in step 1606, or cause such content to be played by other devices in the media system 102 (such as media device 114 and/or display device 104).

Figure 17:
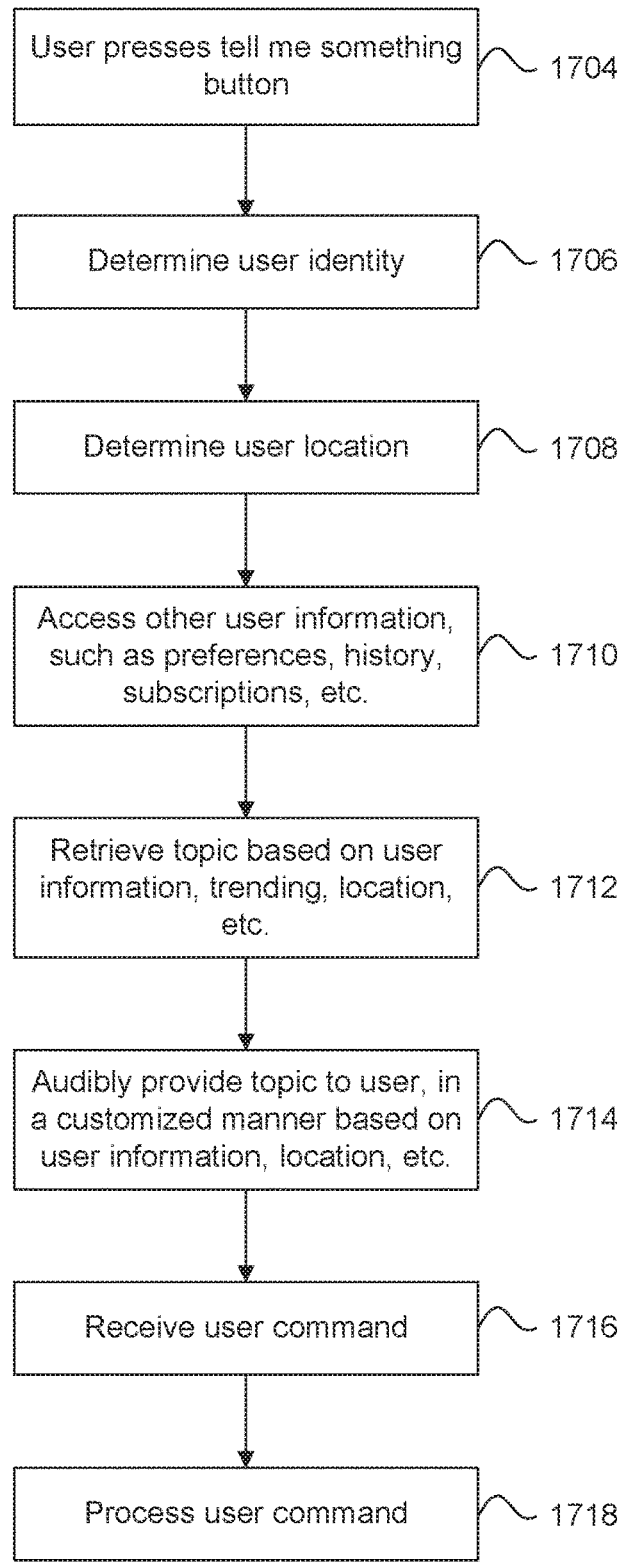
FIG. 17 illustrates a flowchart for controlling an audio responsive electronic device using a tell me something button, according to some embodiments.

As noted above, in some embodiments, the audio responsive electronic device 1402 includes a tell me something button 1412. It is noted that the tell me something button 1412 may have different names in different embodiments. FIG. 17 is a method 1702 directed to the operation of the tell me something button 1412, according to some embodiments. Method 1702 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 17, as will be understood by a person of ordinary skill in the art.

For illustrative and non-limiting purposes, method 1702 shall be described with reference to FIGS. 1 and 14. However, method 1702 is not limited to those examples.

In 1704, user 136 may press the tell me something button 1412 of the audio responsive electronic device 1402. Alternatively, the user 136 may say a trigger word associated with the audio responsive electronic device 1402 followed by "tell me something" (or a similar command).

In 1706, the audio responsive electronic device 1402 may determine the identity of the user 136. In some embodiments, the audio responsive electronic device 1402 may identify the user 136 based on user characteristics, such as user preferences and/or how the user 136 interacts with the audio responsive electronic device 1402 and/or the remote control 138. In other embodiments, the audio responsive electronic device 1402 may identify the user 136 based on networking approaches, such as identifying cell phones (and associated users) within range of the audio responsive electronic device 122 or other devices in the media system 102, such as media device 114. These and other example approaches for identifying the user 136 are described in U.S. patent applications "Network-Based User Identification," Ser. No. 15/478,444 filed Apr. 4, 2017; and "Interaction-Based User Identification," Ser. No. 15/478,448 filed Apr. 4, 2017, both of which are herein incorporated by reference in their entireties.

In step 1708, the audio responsive electronic device 1402 may determine the location of the user 136 using any of the approaches discussed herein, and/or other approaches, such as GPS (global positioning system) or location services functionality that may be included in audio responsive electronic device 122, media device 114, the user 136's smartphone, etc.

In 1710, the audio responsive electronic device 1402 may access information associated with the user 136 identified in step 1706, such as user preferences, user history information, the user's media subscriptions, etc. Such user information may be accessed from other devices in media system 102, such as from media device 114 and/or content sources 120.

In 1712, the audio responsive electronic device 1402 may retrieve a topic from topic database 1408 based on, for example, the location of the user 136 (determined in step 1708) and/or information about the user 136 (accessed in step 1710). The topics in topic database 1408 may include or be related to program scheduling, new or changes in content and/or content providers, public service announcements, promotions, advertisements, contests, trending topics, politics, local/national/world events, and/or topics of interest to the user 136, to name just some examples.

In 1714, the audio responsive electronic device 1402 may generate a message that is based on the retrieved topic and customized for the user 136 based on, for example, the location of the user 136 (determined in step 1708) and/or information about the user 136 (accessed in step 1710). Then, the audio responsive electronic device 1402 may audibly provide the customized message to the user 136.

For example, assume the topic retrieved in step 1712 was a promotion for a free viewing period on Hulu. Also assume the user 136 is located in Palo Alto, CA. The audio responsive electronic device 1402 may access content source(s) 120 and/or other sources available via network 118 to determine that the most popular show on Hulu for subscribers in Palo Alto is "Shark Tank." Using information accessed in step 1710, the audio responsive electronic device 1402 may also determine that the user 136 is not a subscriber to Hulu. Accordingly, in step 1714, the audio responsive electronic device 1402 may generate and say to the user 136 the following customized message: "The most popular Hulu show in Palo Alto is Shark Tank. Say 'Free Hulu Trial' to watch for free."

As another example, assume the topic retrieved in step 1712 was a promotion for discount pricing on commercial free Pandora. The audio responsive electronic device 1402 may access content source(s) 120 and/or other sources available via network 118, and/or information retrieved in step 1710, to determine that the user 136 has a subscription to Pandora (with commericals), and listened to Pandora 13 hours last month. Accordingly, in step 1714, the audio responsive electronic device 1402 may generate and say to the user 136 the following customized message: "You listened to Pandora for 13 hours last month. Say 'Pandora with no commercials' to sign up for discount pricing for commercial-free Pandora."

In 1716, the audio responsive electronic device 1402 receives an audible command from the user 136. The received command may or may not be related to or prompted by the customized topic message of step 1714.

In 1718, the audio responsive electronic device 1402 processes the received user command.

Example Computer System

Figure 18:
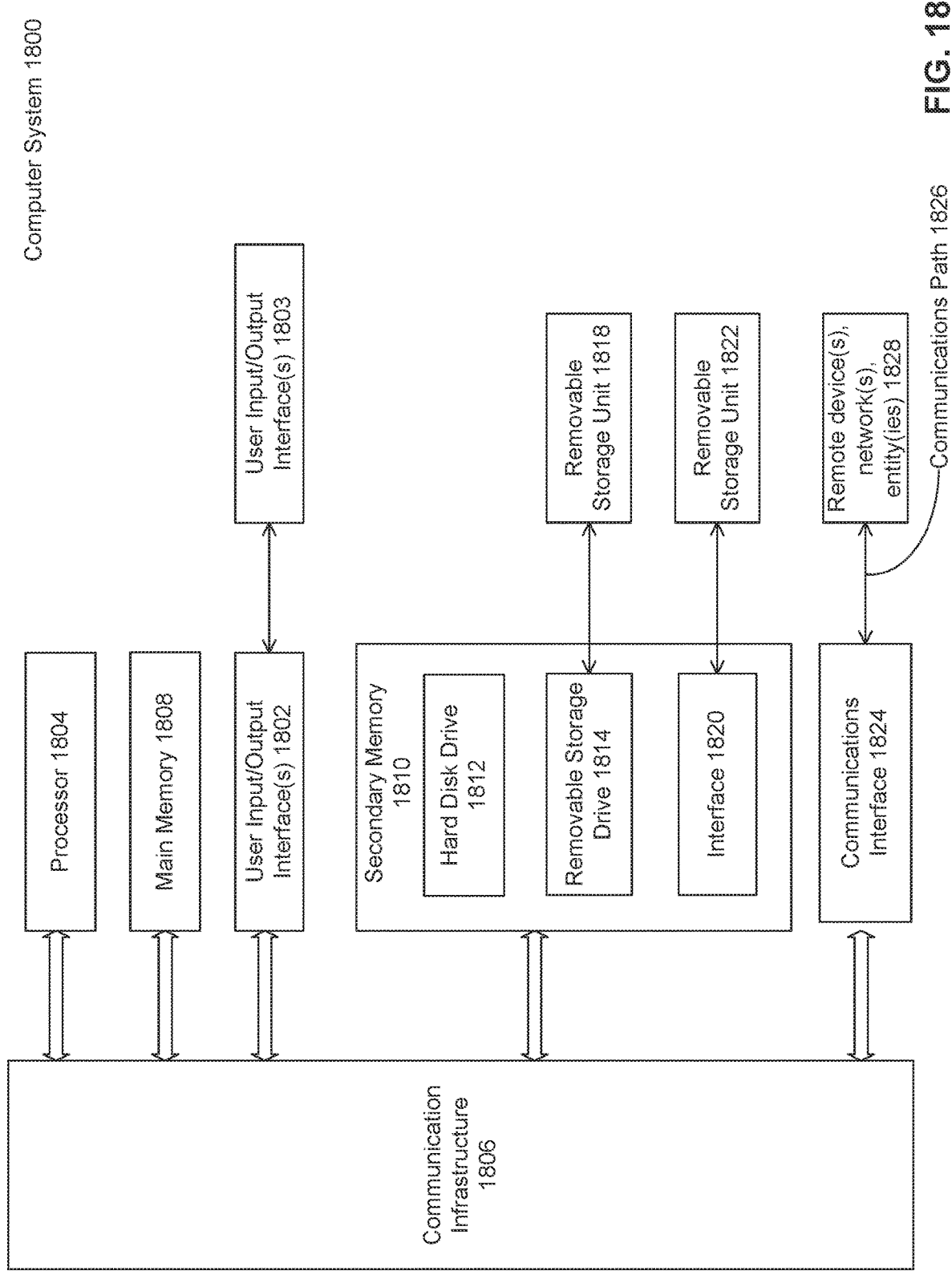
FIG. 18 is an example computer system useful for implementing various embodiments.

Various embodiments and/or components therein can be implemented, for example, using one or more computer systems, such as computer system 1800 shown in FIG. 18. Computer system 1800 can be any computer or computing device capable of performing the functions described herein. Computer system 1800 includes one or more processors (also called central processing units, or CPUs), such as a processor 1804. Processor 1804 is connected to a communication infrastructure or bus 1806.

One or more processors 1804 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1800 also includes user input/output device(s) 1803, such as monitors, keyboards, pointing devices, etc., that communicate with communication infrastructure 1806 through user input/output interface(s) 1802.

Computer system 1800 also includes a main or primary memory 1808, such as random access memory (RAM). Main memory 1808 can include one or more levels of cache. Main memory 1808 has stored therein control logic (i.e., computer software) and/or data.

Computer system 1800 can also include one or more secondary storage devices or memory 1810. Secondary memory 1810 can include, for example, a hard disk drive 1812 and/or a removable storage device or drive 1814. Removable storage drive 1814 can be a floppy disk drive, a magnetic tape drive, a compact disk drive, an optical storage device, tape backup device, and/or any other storage device/drive.

Removable storage drive 1814 can interact with a removable storage unit 1818. Removable storage unit 1818 includes a computer usable or readable storage device having stored thereon computer software (control logic) and/or data. Removable storage unit 1818 can be a floppy disk, magnetic tape, compact disk, DVD, optical storage disk, and/ any other computer data storage device. Removable storage drive 1814 reads from and/or writes to removable storage unit 1818 in a well-known manner.

According to an exemplary embodiment, secondary memory 1810 can include other means, instrumentalities or other approaches for allowing computer programs and/or other instructions and/or data to be accessed by computer system 1800. Such means, instrumentalities or other approaches can include, for example, a removable storage unit 1822 and an interface 1820. Examples of the removable storage unit 1822 and the interface 1820 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1800 can further include a communication or network interface 1824. Communication interface 1824 enables computer system 1800 to communicate and interact with any combination of remote devices, remote networks, remote entities, etc. (individually and collectively referenced by reference number 1828). For example, communication interface 1824 can allow computer system 1800 to communicate with remote devices 1828 over communications path 1826, which can be wired and/or wireless, and which can include any combination of LANs, WANs, the Internet, etc. Control logic and/or data can be transmitted to and from computer system 1800 via communication path 1826.

In some embodiments, a tangible apparatus or article of manufacture comprising a tangible computer useable or readable medium having control logic (software) stored thereon is also referred to herein as a computer program product or program storage device. This includes, but is not limited to, computer system 1800, main memory 1808, secondary memory 1810, and removable storage units 1818 and 1822, as well as tangible articles of manufacture embodying any combination of the foregoing. Such control logic, when executed by one or more data processing devices (such as computer system 1800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 18. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for providing audio control using multiple digital assistants, comprising:
   selecting, by an audio platform, a first digital assistant from a plurality of digital assistants in the audio platform to process an audio input using a trigger word in the audio input, wherein the selected first digital assistant is mapped to the trigger word;
   determining, by the audio platform, that a second digital assistant from the plurality of digital assistants in the audio platform to process an intent associated with the audio input more often than the selected first digital assistant based on tracking of the audio input, wherein the tracking comprises determining a time of day and location of the audio input; and selecting, by the audio platform, the second digital assistant from the plurality of digital assistants in the audio platform to process the audio input based on the determining.

2. The computer-implemented method of claim 1, further comprising:

transmitting the intent to a voice adaptor at a media device, wherein the voice adaptor selects an application to process the intent based on a fixed rule, a default application setting, a search result, or metadata in the intent.

3. The computer-implemented method of claim 1, further comprising:

refining the intent based on information in a cloud computing platform.

4. The computer-implemented method of claim 1, further comprising:

generating the intent from the audio input using the selected first digital assistant.

5. The computer-implemented method of claim 1, further comprising:

converting the audio input into a text input using an automated speech recognizer associated with the selected first digital assistant; and generating the intent from the text input using a natural language unit associated with the selected first digital assistant.

6. The computer-implemented method of claim 1, wherein the determining further comprises:

determining that the second digital assistant processes the intent associated with the audio input more often than the selected first digital assistant based on crowdsourced data, wherein the crowdsourced data indicates how often each digital assistant in the plurality of digital assistants is used to process the intent.

7. The computer-implemented method of claim 6, further comprising:

in response to selecting the second digital assistant, incrementing a count in the crowdsourced data that indicates a number of times the second digital assistant was selected.

8. An audio platform, comprising:

a memory; and at least one processor coupled to the memory and configured to:

select a first digital assistant from a plurality of digital assistants in the audio platform to process audio input using a trigger word in the audio input, wherein the selected first digital assistant is mapped to the trigger word;

determine that a second digital assistant from the plurality of digital assistants in the audio platform to process an intent associated with the audio input more often than the selected first digital assistant based on tracking of the audio input, wherein the tracking comprises determining a time of day and location of the audio input; and select the second digital assistant from the plurality of digital assistants in the audio platform to process the audio input based on the determining.

9. The audio platform of claim 8, wherein the at least one processor is further configured to:

transmit the intent to an audio adaptor at a media device, wherein the audio adaptor selects an application to process the intent based on a fixed rule, a default application setting, a search result, or metadata in the intent.

10. The audio platform of claim 8, wherein the at least one processor is further configured to:

refine the intent based on information in a cloud computing platform.

11. The audio platform of claim 8, wherein the at least one processor is further configured to:

generate the intent from the audio input using the selected first digital assistant.

12. The audio platform of claim 8, wherein the at least one processor is further configured to:

convert the audio input into a text input using an automated speech recognizer associated with the selected first digital assistant; and generate the intent from the text input using a natural language unit associated with the selected first digital assistant.

13. The audio platform of claim 8, wherein to determine that the second digital assistant processes the intent associated with the audio input more often than the selected first digital assistant, the at least one processor is further configured to:

determine that the second digital assistant processes the intent associated with the audio input more often than the selected first digital assistant based on crowdsourced data, wherein the crowdsourced data indicates how often each digital assistant in the plurality of digital assistants is used to process a type of the intent.

14. The audio platform of claim 13, wherein the at least one processor is further configured to:

in response to selecting the second digital assistant, increment a count in the crowdsourced data that indicates a number of times the second digital assistant was selected.

15. A non-transitory computer-readable medium having instructions stored thereon that, when executed by at least one computing device of a command module, cause the at least one computing device to perform operations comprising:

transmitting an audio input to an audio platform, wherein the audio platform selects a first digital assistant from a plurality of digital assistants in the audio platform to process the audio input using a trigger word in the audio input, determines that a second digital assistant from the plurality of digital assistants in the audio platform to process an intent associated with the audio input more often than the selected first digital assistant based on tracking of the audio input, wherein the tracking comprises determining a time of day and location of the audio input, and selects the second digital assistant from the plurality of digital assistants in the audio platform to process the audio input based on the determining; and receiving the intent from the audio platform.

16. The non-transitory computer-readable medium of claim 15, wherein the receiving the intent from the audio platform further comprises:

receiving the intent at an audio adaptor, wherein the audio adaptor selects an application to process the intent based on a fixed rule, a default application setting, a search result, or metadata in the intent.

17. The non-transitory computer-readable medium of claim 15, wherein the audio platform refines the intent based on information in a cloud computing platform.

18. The non-transitory computer-readable medium of claim 15, wherein the audio platform converts the audio input into a text input using an automated speech recognizer associated with the selected first digital assistant, and generates the intent from the text input using a natural language unit associated with the selected first digital assistant.

19. The non-transitory computer-readable medium of claim 15, wherein the audio platform determines that the second digital assistant processes the intent associated with the audio input more often than the selected first digital assistant based on crowdsourced data, wherein the crowdsourced data indicates how often each digital assistant in the plurality of digital assistants is used to process the intent.

20. The non-transitory computer-readable medium of claim 19, wherein the audio platform, in response to selecting the second digital assistant, increments a count in the crowdsourced data that indicates a number of times the second digital assistant was selected.

* * * * *